(12) United States Patent
Smee et al.

(10) Patent No.: US 7,280,467 B2
(45) Date of Patent: Oct. 9, 2007

(54) PILOT TRANSMISSION SCHEMES FOR WIRELESS MULTI-CARRIER COMMUNICATION SYSTEMS

(75) Inventors: John Smee, San Diego, CA (US); Jay Rod Walton, Carlisle, MA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1031 days.

(21) Appl. No.: 10/359,811

(22) Filed: Feb. 7, 2003

(65) Prior Publication Data

US 2004/0131007 A1 Jul. 8, 2004

Related U.S. Application Data

(60) Provisional application No. 60/438,601, filed on Jan. 7, 2003.

(51) Int. Cl.
| H04J 11/00 | (2006.01) |
| H04B 7/216 | (2006.01) |
| H04B 1/06 | (2006.01) |

(52) U.S. Cl. .................. 370/208; 370/320; 370/342; 370/474; 375/130

(58) Field of Classification Search ........ 370/203–208, 370/310–327, 342, 465, 469, 474–479; 375/130
See application file for complete search history.

(56) References Cited

U.S. PATENT DOCUMENTS 5,867,478 A 2/1999 Baum et al.

6,385,264 B1 * 5/2002 Terasawa et al. ........... 375/371
2002/0044591 A1 4/2002 Lee et al.

FOREIGN PATENT DOCUMENTS

| WO | 01/76110 | 10/2001 |
| WO | 01/76110 A2 * | 11/2001 |
| WO | 02069523 | 9/2002 |
| WO | 03034646 | 4/2003 |

OTHER PUBLICATIONS

S. M. Alamouti, "A Simple Transmit Diversity Technique for Wireless Communications," *IEEE Journal on Select Areas in Communications*, Oct. 1998, vol. 16, No. 8, pp. 1451-1458.

* cited by examiner

*Primary Examiner*—Afsar Qureshi
(74) *Attorney, Agent, or Firm*—Thomas R. Rouse; Byron Y. Yafuso; Ross L. Franks

(57) ABSTRACT

Pilot transmission schemes suitable for use in wireless multi-carrier (e.g., OFDM) communication systems. These pilot transmission schemes may utilize frequency, time, or both frequency and time orthogonality to achieve orthogonality among the pilots transmitted by multiple base stations on the downlink. Frequency orthogonality is achieved by transmitting pilots on disjoint sets of subbands. Time orthogonality is achieved by transmitting pilots using different orthogonal codes (e.g., Walsh codes). The pilots may also be scrambled with different scrambling codes, which are used to randomize pilot interference and to enable identification of the transmitters of these pilots. Pilot interference cancellation may be performed to improve performance since subbands used for data transmission by one transmitter may also be used for pilot transmission by another transmitter. Pilot interference is estimated and then subtracted from received symbols to obtain pilot-canceled symbols having improved quality.

61 Claims, 15 Drawing Sheets

PILOT TRANSMISSION SCHEMES FOR WIRELESS MULTI-CARRIER COMMUNICATION SYSTEMS

This application claims the benefit of provisional U.S. application Ser. No. 60/438,601, entitled "Pilot Transmission Schemes for Wireless Multi-Carrier Communication Systems," filed on Jan. 7, 2003, assigned to the assignee of the present application, and incorporated herein by reference in its entirety for all purposes.

BACKGROUND

I. Field

The present invention relates generally to communication, and more specifically to pilot transmission schemes for wireless multi-carrier communication systems.

II. Background

A multi-carrier communication system employs multiple carriers for data transmission to a single end-point. These multiple carriers may be employed, for example, in the context of orthogonal frequency division multiplexing (OFDM) or some other multi-carrier modulation techniques. OFDM effectively partitions the overall system bandwidth into a number of (N) orthogonal subbands, which are also referred to as tones, frequency bins, and frequency subchannels. With OFDM, each subband is associated with a respective carrier upon which data may be modulated.

In a wireless communication system, data to be transmitted is processed (e.g., coded and modulated) at a transmitter and upconverted onto a radio frequency (RP) carrier signal to generate an RF modulated signal. The RF modulated signal is then transmitted over a wireless channel and may reach a receiver via a number of propagation paths. The characteristics of the propagation paths typically vary over time due to a number of factors such as, for example, fading, multipath, and external interference. Consequently, the transmitted RF modulated signal may experience different channel conditions (e.g., different fading and multipath effects) and may be associated with different complex gains and signal-to-noise ratios (SNRs) over time.

In a wireless communication system, a pilot is often transmitted from a transmitter (e.g., a base station) to a receiver (e.g., a terminal) to assist the receiver in performing a number of functions. The pilot is typically generated based on known symbols and processed in a known manner. The pilot may be used by the receiver for channel estimation, timing and frequency acquisition, coherent data demodulation, received signal strength measurements, and so on.

Various challenges are encountered in the design of a pilot transmission scheme for a multi-carrier communication system. As one consideration, since pilot transmission represents overhead in the system, it is desirable to minimize pilot transmission to the extent possible while still providing the desired performance. As another consideration, pilots needs to be transmitted in a manner such that the receivers in the system are able to detect and distinguish the pilots transmitted by the individual transmitters in the system. Moreover, the pilot transmission scheme needs to address the additional dimensionality created by the multiple carriers of the multi-carrier system.

There is therefore a need in the art for pilot transmission schemes for multi-carrier communication systems.

SUMMARY

Pilot transmission schemes suitable for use in wireless multi-carrier communication systems (e.g., OFDM systems) are provided herein. These pilot transmission schemes may utilize frequency orthogonality, time orthogonality, or both frequency and time orthogonality to achieve orthogonality among pilots transmitted by multiple base stations on the downlink. Frequency orthogonality may be achieved by transmitting pilots from different base stations on disjoint sets of subbands. Time orthogonality may be achieved by transmitting pilots using different orthogonal codes (e.g., Walsh codes). The pilots may also be scrambled with different scrambling codes, which are used to randomize pilot interference and to enable identification of the transmitters of these pilots.

The pilot transmission schemes described herein efficiently facilitate both channel estimation and pilot detection. These schemes allow terminals in the system to obtain high quality wideband channel estimates and pilot strength estimates for base stations in the system, which may be used to perform coherent data demodulation, soft handoff, and hard handoff, as described below.

Techniques to estimate and cancel pilot interference are also provided herein. Pilot interference cancellation may be performed to improve performance since subbands used for data or pilot transmission by one transmitter may also be used for pilot transmission by another transmitter (i.e., an "interfering" transmitter). Pilot interference may be estimated by obtaining an estimate of the channel to the interfering source, generating the pilot in the same manner performed by the interfering transmitter, and multiplying the generated pilot with the channel estimate. The pilot interference is then subtracted from received symbols to obtain pilot-canceled symbols having improved quality.

Various aspects and embodiments of the invention are also described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 4A and 4B show exemplary assignments of orthogonal codes to achieve time orthogonality for a 3-sector 1-cell cluster with one antenna and two antennas per sector, respectively;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
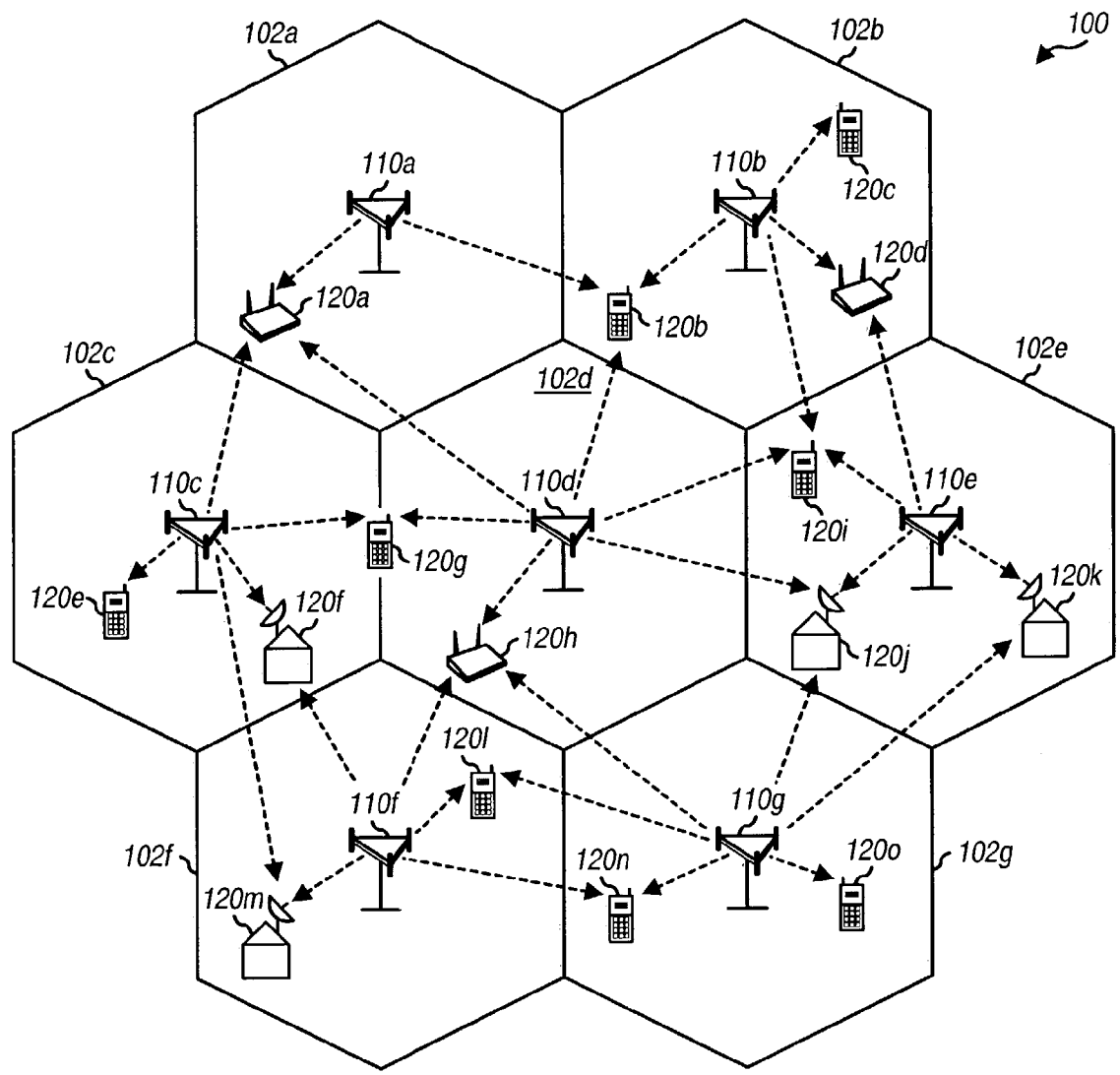
FIG. 1 shows a wireless multiple-access multi-carrier communication system.

FIG. 1 shows a wireless multiple-access multi-carrier communication system 100 that supports a number of users and is capable of implementing the pilot transmission schemes described herein. System 100 includes a number of base stations 110 that support communication for a number of terminals 120. A base station is a fixed station that is used for communicating with the terminals and may also be referred to as an access point, a Node B, or some other terminology.

As shown in FIG. 1, various terminals 120 may be dispersed throughout the system, and each terminal may be fixed (i.e., stationary) or mobile. A terminal may also be referred to as a mobile station, a remote station, a user equipment (UE), a wireless communication device, an access terminal, or some other terminology. Each terminal may communicate with one or possibly multiple base stations on the downlink and/or uplink at any given moment. The downlink (i.e., forward link) refers to the communication link from the base station to the terminal, and the uplink (i.e., reverse link) refers to the communication link from the terminal to the base station. In FIG. 1, terminals 120a through 120o receive pilots, signaling, and possibly user-specific data transmission from base stations 110a through 110 g.

A system controller (not shown in FIG. 1) typically couples to base stations 110 and may be designed to perform a number of functions such as (1) coordination and control for the base stations coupled to it, (2) routing of data among these base stations, and (3) access and control of the terminals served by these base stations.

System 100 may be a cellular system or some other type of wireless system. System 100 may also be designed to implement any of the standards and designs for code division multiple-access (CDMA), time division multiple-access (TDMA), frequency division multiple-access (FDMA), and so on. The CDMA standards include IS-95, cdma2000, IS-856, W-CDMA, and TS-CDMA, and the TDMA standards include GSM. These standards are well known in the art.

Each base station 110 in the system provides coverage for a particular geographic area 102. The coverage area of each base station may be defined, for example, as the area over which the terminals can achieve a particular grade of service (GoS). The size and shape of each base station's coverage area are typically dependent on various factors such as terrain, obstructions, and so on. For simplicity, the coverage area of each base station is often represented by an ideal hexagon. The base station and/or its coverage area are also often referred to as a "cell", depending on the context in which the term is used.

In a typical system deployment, to increase capacity, the coverage area of each base station may be partitioned into multiple sectors. If each cell is partitioned into three sectors, then each sector of a sectorized cell is often represented by an ideal 120° wedge that is ⅓ of the cell. In an actual deployment, the coverage area of each base station often has a shape that is different from the ideal hexagon, and the shape of each sector is often different from the ideal 120° wedge. Moreover, the sectors of a sectorized cell typically overlap at the edges. Each sector may be served by a corresponding base transceiver subsystem (BTS). For a sectorized cell, the base station for that cell often includes all of the BTSs that serve the sectors of that cell. The term "sector" is also often used to refer to a BTS and/or its coverage area, depending on the context in which the term is used.

For simplicity, the following description assumes that each cell is partitioned into three sectors and their BTSs are located within the base station for the cell. This base station is located in the center of the cell. Also for simplicity, in the following description, the term "base station" is used generically for both a fixed station that serves a cell and a fixed station that serves a sector.

For a CDMA system, the pilot transmitted by each base station is spectrally spread across the entire system bandwidth prior to transmission over the wireless channel. At a terminal, the pilot transmitted by each base station may be received with a low signal-to-noise ratio (SNR). However, the complementary despreading operation performed by the terminal provides processing gain that is relied upon to recover the pilot in the presence of a large amount of noise and interference. For a multi-carrier system, it is typically not feasible to perform direct sequence spread spectrum processing for the pilot, as used in CDMA. Other means must then be used to transmit the pilot from each base station such that it can be readily detected by the terminals in the system.

Pilot transmission schemes suitable for use in multi-carrier communication systems, such as the one shown in FIG. 1, are provided herein. As noted above, pilots are transmitted to support various functions that may be needed for proper system operation, such as timing and frequency acquisition, channel estimation, coherent data demodulation, and so on. The multiple carriers may be provided by OFDM or some other multi-carrier modulation technique. The pilot transmission schemes described herein are well suited for use on the downlink but may also be used for the uplink.

For clarity, the pilot transmission schemes are specifically described for the downlink of an OFDM system. This OFDM system has N orthogonal subbands. Each base station can transmit one OFDM symbol in each OFDM symbol period, as described below.

I. Pilot Transmission Constructs

Table 1 lists three "constructs" that may be utilize for pilot transmission schemes.

TABLE 1

| Constructs | Description |
| --- | --- |
| Frequency Orthogonality | Transmission of pilots on different disjoint sets of subbands by different base stations to achieve orthogonality in the frequency domain for the pilot transmissions. |

TABLE 1-continued

| Constructs | Description |
| --- | --- |
| Time Orthogonality | Use of different orthogonal codes (e.g., Walsh codes) for the pilots by different base stations to achieve orthogonality in the time domain for the pilot transmissions. |
| Scrambling Codes | Use of different scrambling codes for the pilots by different base stations for pilot interference randomization and base station identification. |

The orthogonal and scrambling "codes" are also referred to as "sequences" in the following description. Each of the constructs listed in Table 1 is described in further detail below. The processing at the base station and the terminal for these constructs is also described below.

Various pilot transmission schemes may be devised based on any one or any combination of these constructs. For example, a pilot transmission scheme may employ (1) frequency and time orthogonality, (2) frequency orthogonality and scrambling codes, (3) frequency orthogonal, time orthogonality, and scrambling codes, or (4) some other combination.

1. Frequency Orthogonality

Frequency orthogonality may be used to avoid interference resulting from simultaneous transmission of pilots by multiple base stations. For frequency orthogonality, pilots are transmitted by multiple base stations on different sets of subbands that are "disjoint" (where disjoint is described below) so that interference is avoided. Frequency orthogonality may be achieved in various manners, some of which are described below.

Figure 2A:
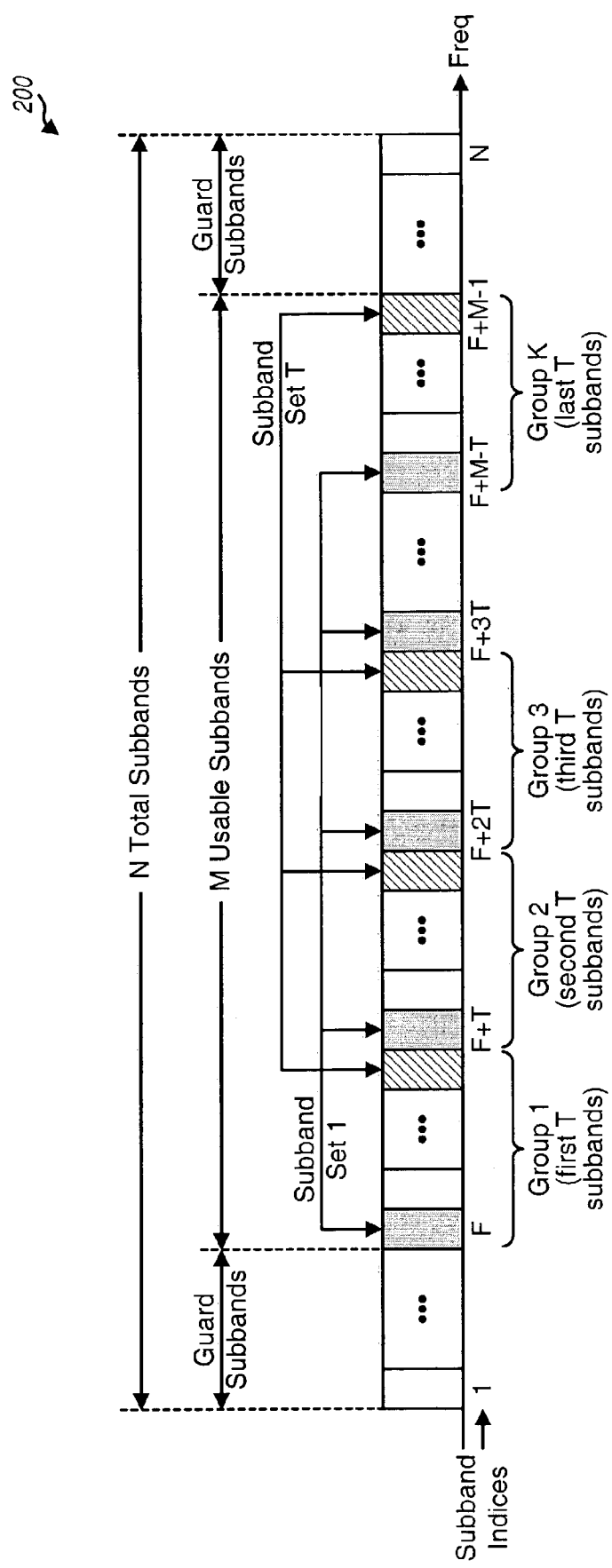
FIG. 2A shows an OFDM subband structure.

FIG. 2A shows an OFDM subband structure 200 that may be used for multi-carrier system 100. The system has an overall system bandwidth of W MHz, which is partitioned into N orthogonal subbands using OFDM. In a typical OFDM system, only M of the N total subbands are used for pilot and data transmission, where M<N. The remaining N−M subbands are not used for pilot/data transmission and serve as guard subbands to allow the system to meet spectral mask requirements. The M usable subbands include subbands F through F+M−1, where F is an integer typically selected such that the M usable subbands are centered in the middle of the operating band.

FIG. 2A also shows an embodiment of the partitioning of the M usable subbands for pilot transmission. In this embodiment, the M usable subbands are initially divided into K groups, with each group including T consecutive subbands. In general, K, T, and M may each be any integer greater than one and K·T≦M. The T subbands in each group are then assigned to T sets such that the i-th subband in each group is assigned to the i-th set.

Figure 2B:
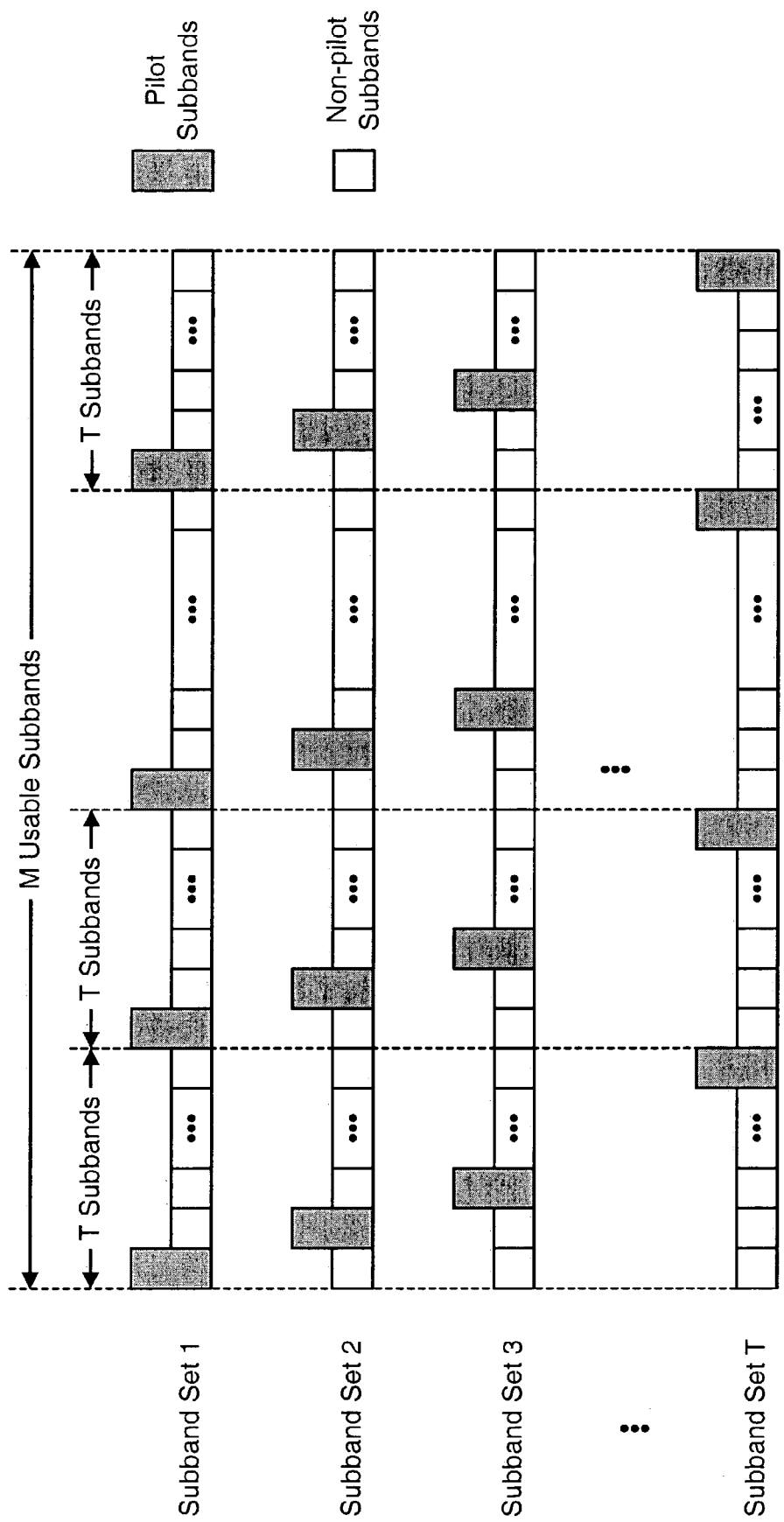
FIG. 2B shows T disjoint sets of subbands based on the OFDM subband structure shown in FIG. 2A.

FIG. 2B shows the T sets of subbands generated based on the partitioning shown in FIG. 2A. The K subbands in each of the T sets are shown by the shaded boxes. For this embodiment, the K subbands in each set are uniformly/evenly distributed across the M usable subbands, and consecutive subbands in the set are spaced apart by T subbands. The T subband sets may be assigned to T cells or T sectors for pilot transmission. Each cell or sector only transmits pilot on the subbands in the set assigned to that cell/sector.

As a specific example, the multi-carrier system may have 512 subbands that are assigned indices of 1 through 512. Of these 512 subbands, 50 subbands may be allocated for pilot transmission in each sector. The 512 subbands may then be used to form 9 sets of 50 subbands (i.e., T=9 and K=50), as shown in Table 2.

TABLE 2

| Set | Subbands |
| --- | --- |
| 1 | 10, 20, 30, . . . 500 |
| 2 | 11, 21, 31, . . . 501 |
| 3 | 12, 22, 32, . . . 502 |
| 4 | 13, 23, 33, . . . 503 |
| 5 | 14, 24, 34, . . . 504 |
| 6 | 15, 25, 35, . . . 505 |
| 7 | 16, 26, 36, . . . 506 |
| 8 | 17, 27, 37, . . . 507 |
| 9 | 18, 28, 38, . . . 508 |

The 9 subband sets may then be assigned to 9 different sectors for pilot transmission.

In general, the M usable subbands may be allocated to the T sets in various manners, and this is within the scope of the invention. The T sets may include the same or different numbers of subbands. Moreover, the subbands in each set may be uniformly or non-uniformly distributed across the M usable subbands. The T subband sets are "disjoint" from one another so that interference is avoided. The subband sets are disjoint in that each of the M usable subbands is assigned to at most one set. Each set further includes a sufficient number of subbands to enable the terminals to characterize the channel based on the pilot transmission on only these subbands. In general, the number of sets to form and the number of subbands to be included in each set (i.e., the specific values for T and K) may be dependent on various factors such as:

the number of usable subbands in the system;

the delay spread or coherence bandwidth of the system, which determines the maximum spacing between consecutive pilot subbands in each set to avoid performance degradation;

the size of the cluster for which frequency orthogonality is to be achieved; and whether or not time orthogonality is also used for pilot transmission.

The cyclic prefix for OFDM symbols (described below) may be defined to include $C_p$ samples, where $C_p$ is properly selected based on the delay spread of the system such that the cyclic prefix contains a significant portion of all multipath energies. To avoid performance degradation, the number of subbands in each set (K) may be selected such that $K \geq C_p$, and these subbands may be evenly distributed across the system operating bandwidth. In this case, the maximum number of disjoint sets that may be formed is $N/C_p$. For example, if N=256 and $C_p$=16, then up to 16 sets of subbands may be formed. Fewer number of disjoint sets may also be formed, with each set including more than $C_p$ subbands. In this case, the inclusion of more than the minimum required number of subbands can allow the pilot to be received with higher signal quality, and thus improved channel estimate and pilot strength estimate may be obtained. Alternatively, greater number of disjoint sets may also be formed, with each set including less than $C_p$ subbands. In this case, the inclusion of fewer than the minimum required number of subbands may result in inadequate characterization of the frequency selectivity of the operating band, and some performance degradation may occur.

For simplicity, the following description assumes that each of the T subband sets include K subbands, the subbands in each set are uniformly distributed and are spaced apart by T subbands (as shown in FIG. 2B), and K·T=M. The number of sets to form is dependent on the size of the cluster for which frequency orthogonality is desired, as described below.

Figure 3A:
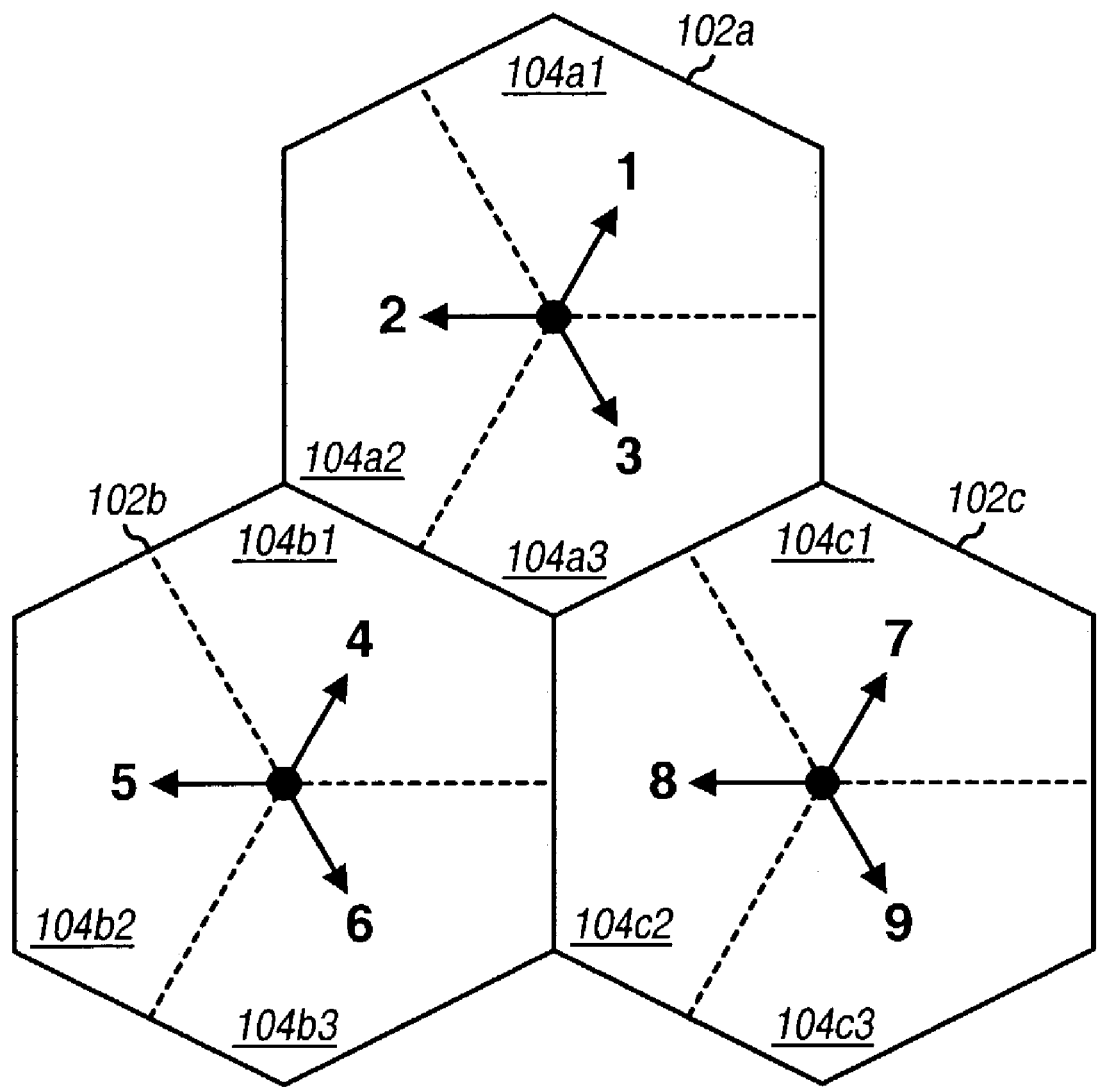
FIGS. 3A and 3B show exemplary assignments of subbands for a 9-sector 3-cell cluster and a 21-sector 7-cell cluster, respectively, to achieve frequency orthogonality.

FIG. 3A shows an exemplary subband assignment to achieve frequency orthogonality for a cluster with 3 cells, where each cell includes 3 sectors (i.e., a 9-sector 3-cell cluster). Each of the 9 sectors in the cluster is assigned one of 9 subband sets (which may be formed, for example, as shown in Table 2). The subband set assigned to each sector is indicated by the numeric reference next to the arrow in FIG. 3A. Each sector would then transmit its pilot on only the subbands in its assigned set. The 9 sectors in the cluster may simultaneously transmit their pilots on 9 disjoint sets of subbands while achieving orthogonality in the frequency domain and avoiding interference.

Figure 3B:
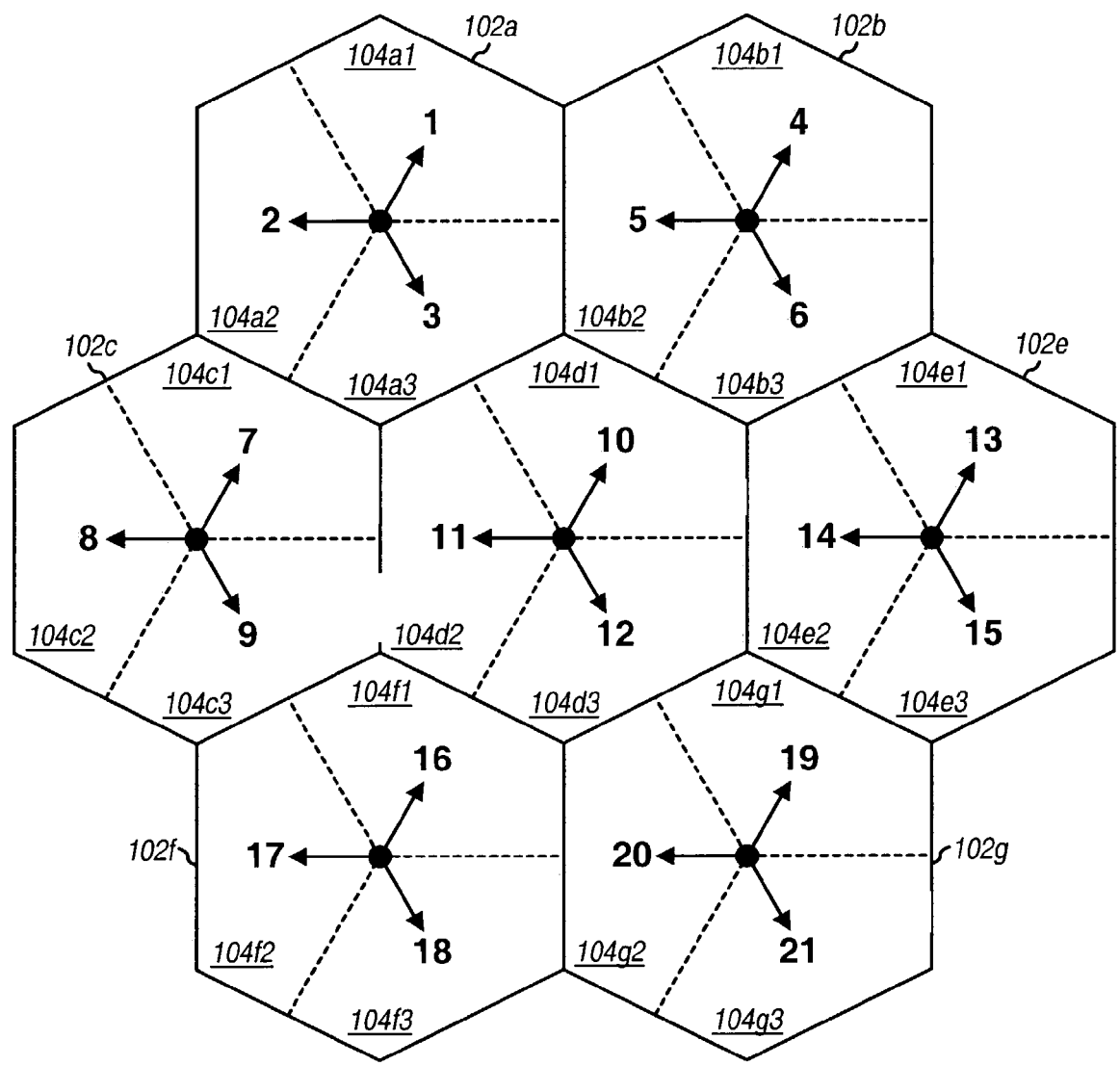

FIG. 3B shows an exemplary subband assignment to achieve frequency orthogonality for a cluster with 7 cells, where each cell includes 3 sectors (i.e., a 21-sector 7-cell cluster). Each of the 21 sectors in the cluster is assigned one of 21 subband sets. The 21 sectors in the cluster may simultaneously transmit their pilots on 21 disjoint sets of subbands while achieving orthogonality in the frequency domain and avoiding interference.

In general, a cluster may be defined to include any number of cells, and each cell may comprise any number of sectors. As examples, a cluster may be defined to include 1, 2, 3, 7, or 19 cells. The size of the cluster may be dependent on various factors, such as those enumerated above.

Frequency orthogonality may also be achieved for a system that employs multiple: antennas at each sector for pilot and data transmission to achieve spatial diversity and improve reliability. For example, each sector may transmit data from two antennas using a space-time transmit diversity (STTD) scheme or an Alamouti scheme. The STTD scheme is described in 3G TS 25.211 and in provisional U.S. patent application Ser. No. 60/421,309, entitled "MIMO WLAN System," filed Oct. 25, 2002, assigned to the assignee of the present application, and incorporated herein by reference. The Alamouti scheme is described by S. M. Alamouti in a paper entitled "A Simple Transmit Diversity Technique for Wireless Communications," IEEE JSAC, October 1998, which is also incorporated herein by reference. For a system with sectors having multiple antennas, each antenna may be assigned a different subband set.

2. Time Orthogonality

Time orthogonality may be achieved by "covering" the pilot of each cell or sector with a different orthogonal code. At a terminal, the pilot from each cell/sector may be recovered by "decovering" the received signal with the same orthogonal code used by that cell/sector. Covering is a process whereby a given pilot or data symbol (or a set of Q pilot/data symbols with known values) to be transmitted is multiplied by all Q chips of a Q-chip orthogonal sequence to obtain Q covered symbols, which are further processed and then transmitted. Decovering is a complementary process whereby received symbols are multiplied by (a) the Q chips of the same Q-chip orthogonal sequence and (b) the complex conjugate of the pilot or data symbol (or the complex conjugate of the Q pilot/data symbols) to obtain Q decovered symbols, which are then accumulated to obtain an estimate of the transmitted pilot or data symbol. Covering and decreeing are known in the art and also described below. The decovering removes or cancels the pilots transmitted by other cells/sectors that use different orthogonal codes for their pilots. In this way, orthogonality among the pilot transmissions from multiple cells/sectors may be achieved.

The effectiveness of the pilot orthogonalization through covering is dependent on having the knowledge of the timing for the base stations. Time orthogonality may be achieved for sectors of the same cell since these sectors may be operated synchronously. The cells in each cluster or all cells in the system may also be operated synchronously to allow time orthogonality to be achieved for the pilots transmitted by these cells.

Time orthogonality may be achieved with various types of orthogonal codes, such as Walsh codes and orthogonal variable spreading factor (OVSF) codes. The length of the orthogonal codes used for pilot covering is dependent on the number of orthogonal codes required, which in turn is dependent on the size of the cluster for which time orthogonality is to be achieved. For example, if time orthogonality is desired for a cell with 3 sectors, then 3 orthogonal codes are needed (i.e., one code for each sector) and each orthogonal code would then have a length of 4 chips.

Table 3 lists four 4-chip Walsh codes that may be assigned to up to four different sectors, cells, or antennas.

TABLE 3

| Walsh Codes | Values | | | |
|---|---|---|---|---|
| $W_1(n)$ | 1 | 1 | 1 | 1 |
| $W_2(n)$ | 1 | 1 | −1 | −1 |
| $W_3(n)$ | 1 | −1 | 1 | −1 |
| $W_4(n)$ | 1 | −1 | −1 | 1 |

A specific Walsh code may be assigned to each sector or each antenna of a given cell. A value of "−1" for the Walsh code may indicate an inversion of the pilot symbol (i.e., $p_k(n) \Rightarrow -p_k(n)$) and a value of "1" may indicate no inversion. The same Walsh code may be applied to each of the subbands used for pilot transmission. For each pilot subband, the four chips of the Walsh code are applied to four pilot symbols to be transmitted in four consecutive OFDM symbol periods. The length of the Walsh code is thus $T_W = 4 \cdot T_{sym}$, where $T_{sym}$ denotes one OFDM symbol period. If the pilot transmission is longer than four OFDM symbol periods, then the same Walsh code may be repeated as many times as needed. A Walsh code is also referred to as a Walsh sequence or a Walsh symbol, and $T_W$ denotes one Walsh symbol period.

FIG. 4A shows an exemplary orthogonal code assignment to achieve time orthogonality for a cell with three sectors (i.e., a 3-sector 1-cell cluster). Each of the three sectors in the cell is assigned a different orthogonal code. The three orthogonal codes assigned to the 3 sectors are labeled as A, B, and C. As indicated in FIG. 4A, the same subband set may be used by all three sectors in the cell. Orthogonality is then achieved in the time domain for the pilot transmissions from these three sectors via the use of different orthogonal codes.

FIG. 4B shows an exemplary orthogonal code assignment to achieve time orthogonality for a cell with three sectors, with each sector employing two antennas for pilot and data transmission. Each of the three sectors in the cell is assigned two orthogonal codes, one code for each antenna. The three pairs of orthogonal codes assigned to the three sectors are labeled as A/B, C/D, and E/F. The 3-sector cell would then require a total of six orthogonal codes, and each orthogonal code may then have a length of 8 chips.

The time orthogonality property may be degraded by temporal variations in the propagation paths between the base stations and the terminal. Thus, it is desirable to use short orthogonal codes so that the propagation paths are essentially constant over the duration of the orthogonal codes.

3. Combined Frequency and Time Orthogonality

A combination of frequency and time orthogonality may be used for pilot transmission. In one embodiment, frequency orthogonality is achieved for multiple cells in a cluster, and time orthogonality is achieved for multiple sectors within each cell.

Figure 4C:
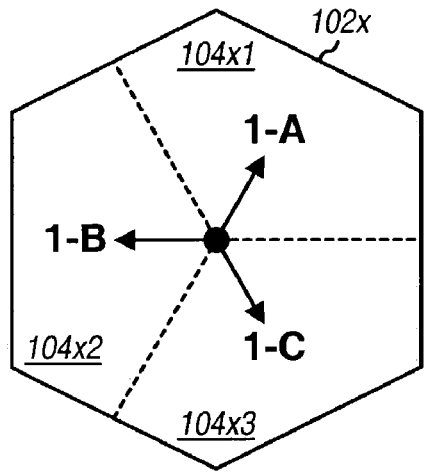
FIGS. 4C and 4D show exemplary assignments of subbands and orthogonal codes for a 9-sector 3-cell cluster and a 21-sector 7-cell cluster, respectively, to achieve frequency and time orthogonality.
Figure 4C:
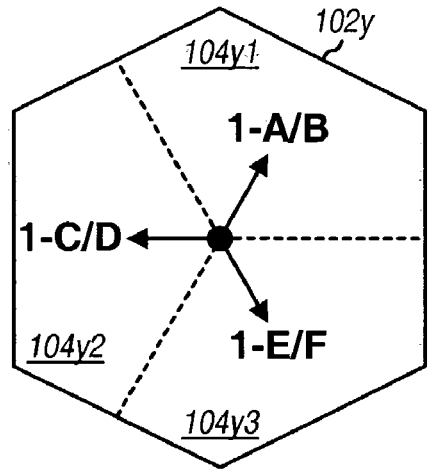
Figure 4C:
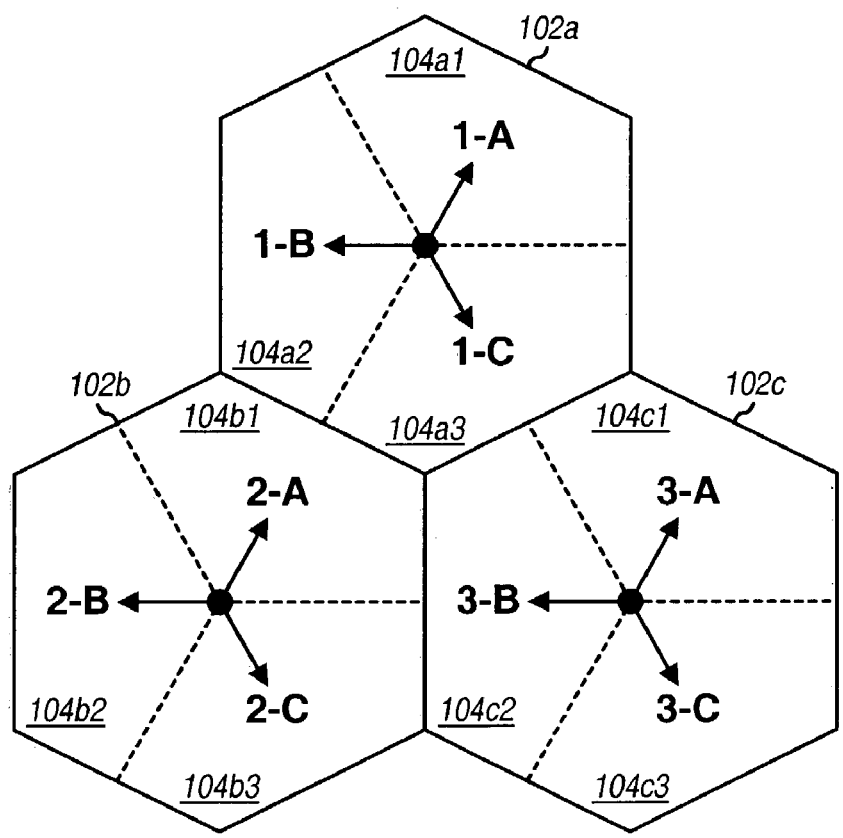

FIG. 4C shows an exemplary subband and code assignment to achieve frequency and time orthogonality for a 9-sector 3-cell cluster. Each of the three cells in the cluster is assigned a different subband set to achieve frequency orthogonality among the three cells. The three sectors of each cell are also assigned three different orthogonal codes to achieve time orthogonality among the three sectors. Each sector of each cell would then transmit its pilot using its assigned orthogonal code and only on the subbands in the set assigned to its cell. Orthogonality is then achieved for the pilot transmissions from the nine sectors in this cluster and interference is avoided.

Figure 4D:
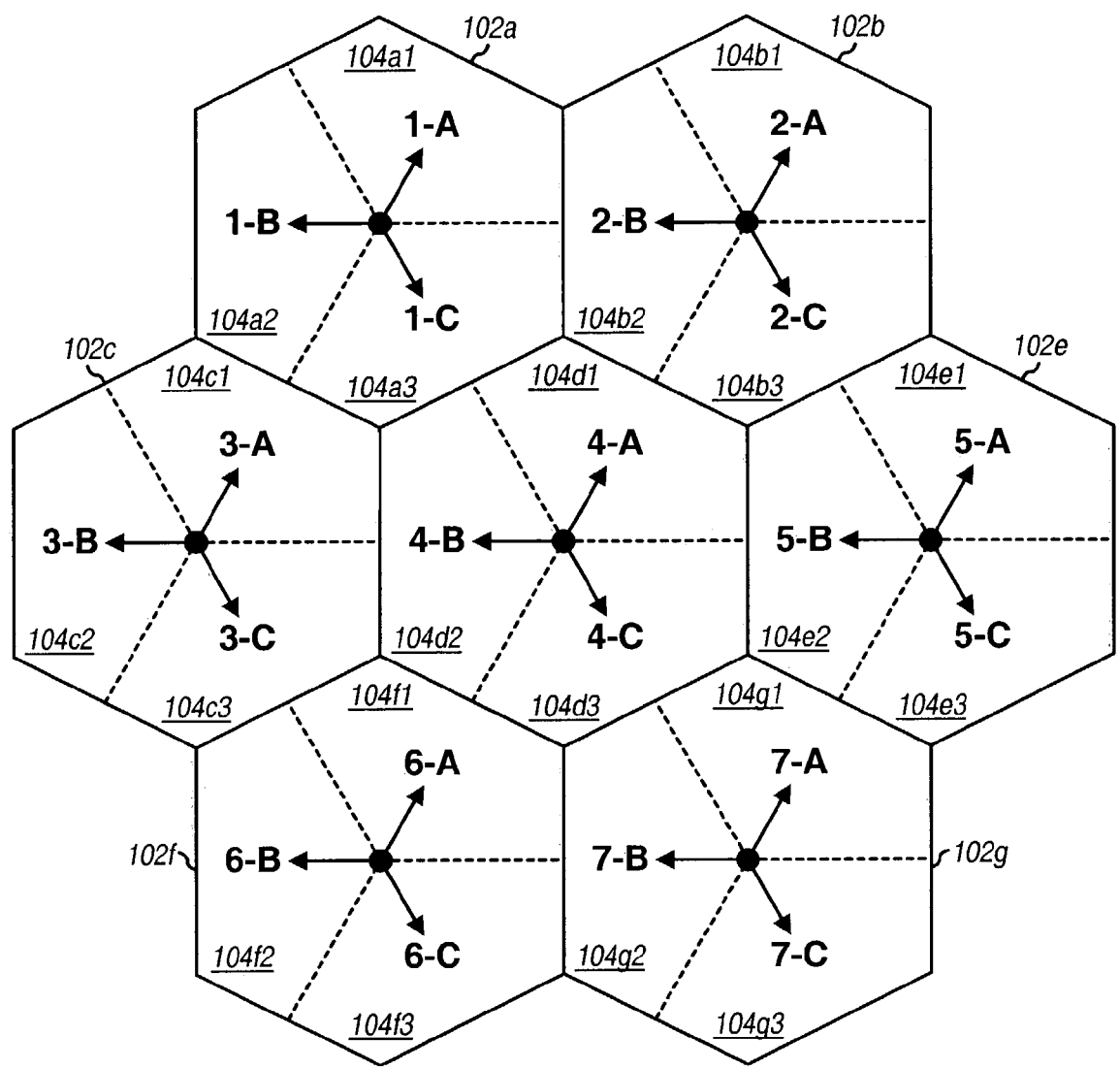

FIG. 4D shows an exemplary subband and code assignment to achieve frequency and time orthogonality for a 21-sector 7-cell cluster. Each of the seven cells in the cluster is assigned a different subband set. The three sectors of each cell are also assigned different orthogonal codes. Each sector of each cell would then transmit its pilot using its assigned orthogonal code and only on the assigned subbands.

Frequency and time orthogonality may also be achieved in some other manners, and this is within the scope of the invention. For example, multiple cells may be assigned the same subband sets but different orthogonal codes. As another example, multiple subband sets may be assigned to multiple sectors of the same cell, and different cells in the cluster may be assigned different orthogonal codes.

For a system with sectors having multiple antennas, orthogonality may be achieved for the pilot transmissions from the multiple antennas in various manners. In one embodiment, each cell is assigned one subband set, and each antenna in the cell is assigned a different orthogonal code. If each sector includes two antennas, then each sector may be assigned a pair of orthogonal codes, as shown in FIG. 4B. In another embodiment, the multiple sectors of a cell are assigned different orthogonal codes, and the multiple antennas of each sector are assigned different subband sets. The same subband sets may be used for all sectors of the same cell, and antennas assigned with the same subband set are assigned different orthogonal codes. For example, for a 3-sector cell with each sector including two antennas, two subband sets (e.g., sets 1 and 2) may be assigned to the two antennas of each cell, and the three sectors may be assigned orthogonal codes A, B, and C. One sector of the cell may be assigned subband set/orthogonal code pairings of 1-A and 2-A, the second sector may be assigned 1-B and 2-B, and the third sector may be assigned 1-C and 2-C.

4. Scrambling Codes

A scrambling code may be used to randomize pilot interference and to enable identification of the base station. A different scrambling code may be assigned to each sector, each cell, or each cluster. The scrambling code may be a pseudo-random number (PN) sequence or some other unique sequence. The scrambling code may be applied to the pilot in the frequency domain (e.g., before the orthogonal code covering), as described below. The scrambling code may also be applied in the time domain (e.g., after the OFDM processing), in which case the scrambling code rate should not be greater than the OFDM symbol rate to preserve frequency orthogonality. The complementary processing is then performed by the terminal to recover the pilot. The processing at the base station and terminal for scrambling and descrambling is described below.

Figure 5:
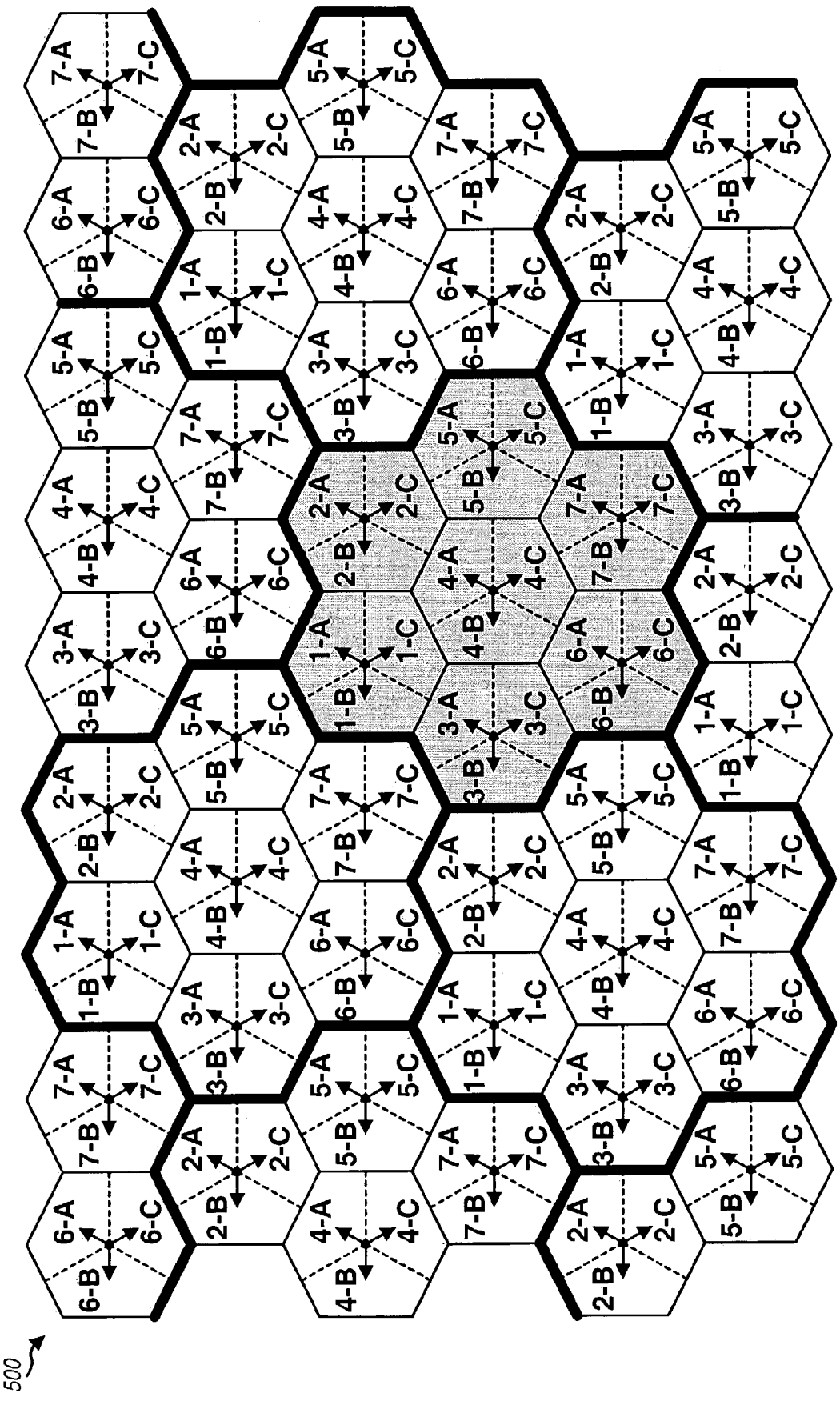
FIG. 5 shows an exemplary system layout whereby a different scrambling code is assigned to each 7-cell cluster.

FIG. 5 shows an exemplary system layout 500 whereby a different scrambling code is assigned to each 7-cell cluster. Each cluster in the layout is outlined by a thick solid line. One exemplary cluster is shown with seven shaded cells. For this embodiment, the seven cells in each cluster are assigned different subband sets (which are labeled 1 through 7), and the three sectors in each cell are assigned different orthogonal codes (which are labeled A, B, and C). The pilot transmission from each sector in the layout can be identified by (1) the subband set assigned to the cell in which the sector belongs, (2) the orthogonal code assigned to the sector, and (3) the scrambling code assigned to the cluster in which the sector belongs. Other system layouts with different assignments of subbands, orthogonal codes, and scrambling codes may also be developed, and this is within the scope of the invention.

As shown in FIG. 5, the terminals in a given sector will receive pilot interference from only other sectors that are assigned with the same subband set and the same orthogonal code. For example, the terminals in a sector labeled as 1-A will receive pilot interference from only other sectors labeled as 1-A in the layout.

Each scrambling code $S_i(n)$ is a unique sequence of code chips, where n is the chip index for the sequence. In an embodiment, each scrambling code chip is a complex value with the form $s_i(n)+j\hat{s}_i(n)$, where $s_i(n)$ and $\hat{s}_i(n)$ may each take on a value of either +1 or −1. In other embodiments, the scrambling codes may be defined in some other manners, and with either real or complex values for the code chips.

The scrambling may be performed in various manners, depending on the characteristics of the wireless channel. In general, the channel should be essentially constant over the entire time duration in which each scrambling code chip is applied. The time interval over which the channel is essentially constant is often referred to as coherence time and may be denoted as $\tau$. The length of the orthogonal code is denoted as $T_W$, where $T_W = 4 \cdot T_{sym}$ for the 4-chip Walsh sequences shown in Table 3.

For a first scrambling scheme, if the coherence time of the channel is much greater than the orthogonal code length (i.e., $\tau >> T_W$), then the scrambling code may be applied across multiple orthogonal sequences. In particular, each scrambling code chip may be applied to one orthogonal sequence of length $T_W$. The same scrambling code chip may be applied to each of the K subbands used for pilot transmission. For the exemplary Walsh sequences shown in Table 3, each scrambling code chip is applied to four Walsh code chips that are applied to four pilot symbols to be transmitted in four consecutive OFDM symbol periods.

For the first scrambling scheme, to recover the pilot from a particular sector, a terminal may perform orthogonal code decovering followed by scrambling code descrambling using the orthogonal code and scrambling code assigned to that sector. The terminal may also perform coherent integration over all or part of the scrambling sequence to recover the pilot and to discriminate "co-channel" sectors (i.e., sectors assigned with the same subband sets but different orthogonal codes and/or scrambling codes). Coherent integration refers to a process whereby multiple complex-valued symbols are combined in a manner to take into account their phase information.

For a second scrambling scheme, if the coherence time of the channel is short such that the terminals are able to perform coherent integration over only a single orthogonal sequence (or one Walsh symbol), then each scrambling code chip may be applied to one orthogonal code chip. The same or different scrambling code chips may be used for the K pilot subbands. For example, for the exemplary 4-chip Walsh sequences shown in Table 3, the scrambling code may be defined with a length of 4·K. The first K scrambling code chips may then be used for the K pilot subbands for the first Walsh code chip, the next K scrambling code chips may be used for the K pilot subbands for the second Walsh code chip, the next K scrambling code chips may be used for the K pilot subbands for the third Walsh code chip, and the last K scrambling code chips may be used for the K pilot subbands for the fourth and last Walsh code chip.

For the second scrambling scheme, the same scrambling sequence may be used by all base stations for which time orthogonality is to be achieved. The scrambling provides pilot interference randomization. Since the same scrambling sequence is used by multiple base stations, each base station may be identified by its assigned orthogonal code, possibly the scrambling code, and its assigned set of pilot subbands.

For both scrambling schemes, to recover the pilot, a terminal may derive a pilot estimate for each pilot subband as described below. The receiver may then obtain (1) an estimate of the channel response for each of a number of pilot and data subbands based on the pilot estimates for all K pilot subbands and (2) an estimate of the received pilot power as the sum the squared magnitude of the pilot estimates for all K pilot subbands. The processing by the terminal for the pilot is described in further detail below.

II. Pilot Transmission Schemes

Pilots may be transmitted by the base stations on the downlink in various manners to facilitate both pilot detection and channel estimation. Pilot detection may be used to facilitate system synchronization (frequency and timing acquisition), hard handoff, and soft handoff. Channel estimation may be used to facilitate coherent data demodulation. Table 4 lists four exemplary pilot transmission schemes for multi-carrier communication systems.

TABLE 4

| | Pilot Structure | |
|---|---|---|
| System Timing | TDM Bursts | Continuous |
| Synchronous | Synchronous burst pilot transmission scheme: pilots are transmitted in the same designated time intervals by all sectors in the system. | Synchronous continuous pilot transmission scheme: each sector continuously transmits its pilot on a designated set of subbands based on system timing. |
| Asynchronous | Asynchronous burst pilot transmission scheme: pilots are transmitted by sectors in time intervals determined based on their individual timing. | Asynchronous continuous pilot transmission scheme: each sector continuously transmits its pilot on a designated set of subbands based on its timing. |

For a burst pilot structure, each sector transmits its pilot in bursts in designated time intervals or slots (instead of continuously). Each sector may transmit pilot and data in a time division multiplex (TDM) manner. For a continuous pilot structure, each sector continuously transmits its pilot on its assigned set of pilot subbands. Each sector may transmit data on the remaining usable subbands not designated for pilot transmission.

For a synchronous system, the timing of all sectors of all cells in the system is synchronized (e.g., based on GPS time or some other common timing source). For an asynchronous system, the timing of all sectors of each cell may be synchronized, but the timing for different cells in the system is not synchronized.

For a synchronous burst pilot transmission scheme, the sectors and cells in the system are synchronous and transmit their pilots in bursts in the same designated time slots. For this scheme, all sectors transmit their pilots at the same time, but the pilots are orthogonalized by the use of disjoint sets of pilot subbands and/or orthogonal codes. Data is not transmitted during periods of pilot transmission. A terminal may be able to obtain higher quality channel estimates for different sectors because no interference is received from data transmission. Moreover, the channel estimate for a given sector may be further improved by canceling the interference from pilots transmitted on the same set of pilot subbands by other sectors, using pilot interference cancellation techniques described below.

Figure 6A:
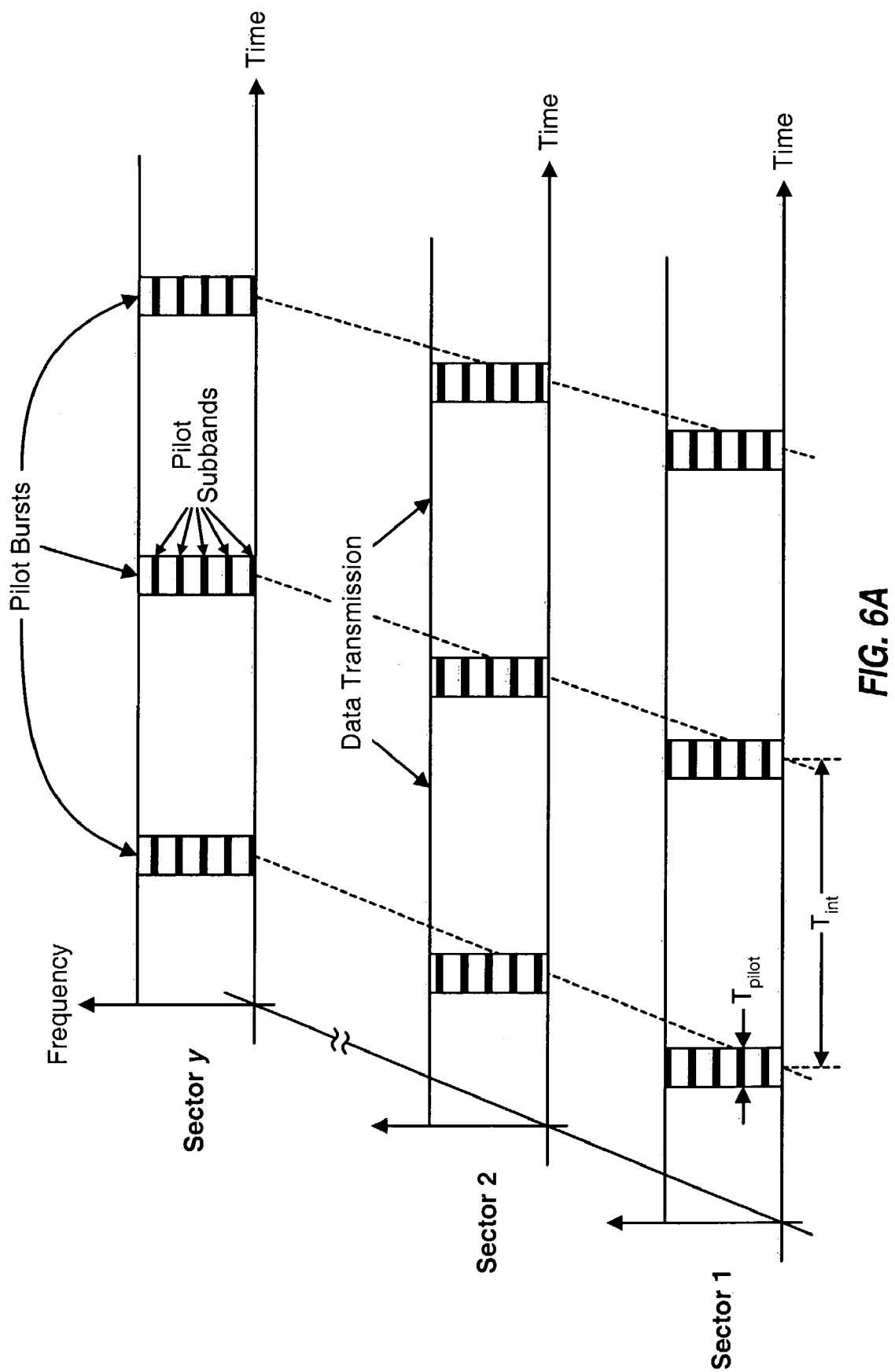
FIGS. 6A and 6B show the transmission of pilots from multiple sectors for a synchronous burst pilot transmission scheme and a synchronous continuous pilot transmission scheme, respectively.

FIG. 6A shows the transmission of pilots from multiple sectors for the synchronous burst pilot transmission scheme. For this scheme, the sectors transmit their pilots on disjoint sets of subbands in bursts of a particular time duration, $T_{pilot}$, with a particular time spacing, $T_{int}$, between bursts. As indicated in FIG. 6A, the timing of the sectors is synchronized such that the pilot bursts are approximately aligned at the time of their transmission. Each sector may transmit data in all usable subbands in the time period between pilot bursts. (For simplicity, frequency and time are not drawn to scale in FIGS. 6A and 6B.)

For a synchronous continuous pilot transmission scheme, the sectors and cells in the system are synchronous, and each sector continuously transmits its pilots on a designated set of pilot subbands. For this scheme, the pilots from different sectors may further be orthogonalized by the use of different orthogonal codes. For each sector, data is not transmitted on the set of subbands designated for pilot transmission.

Figure 6B:
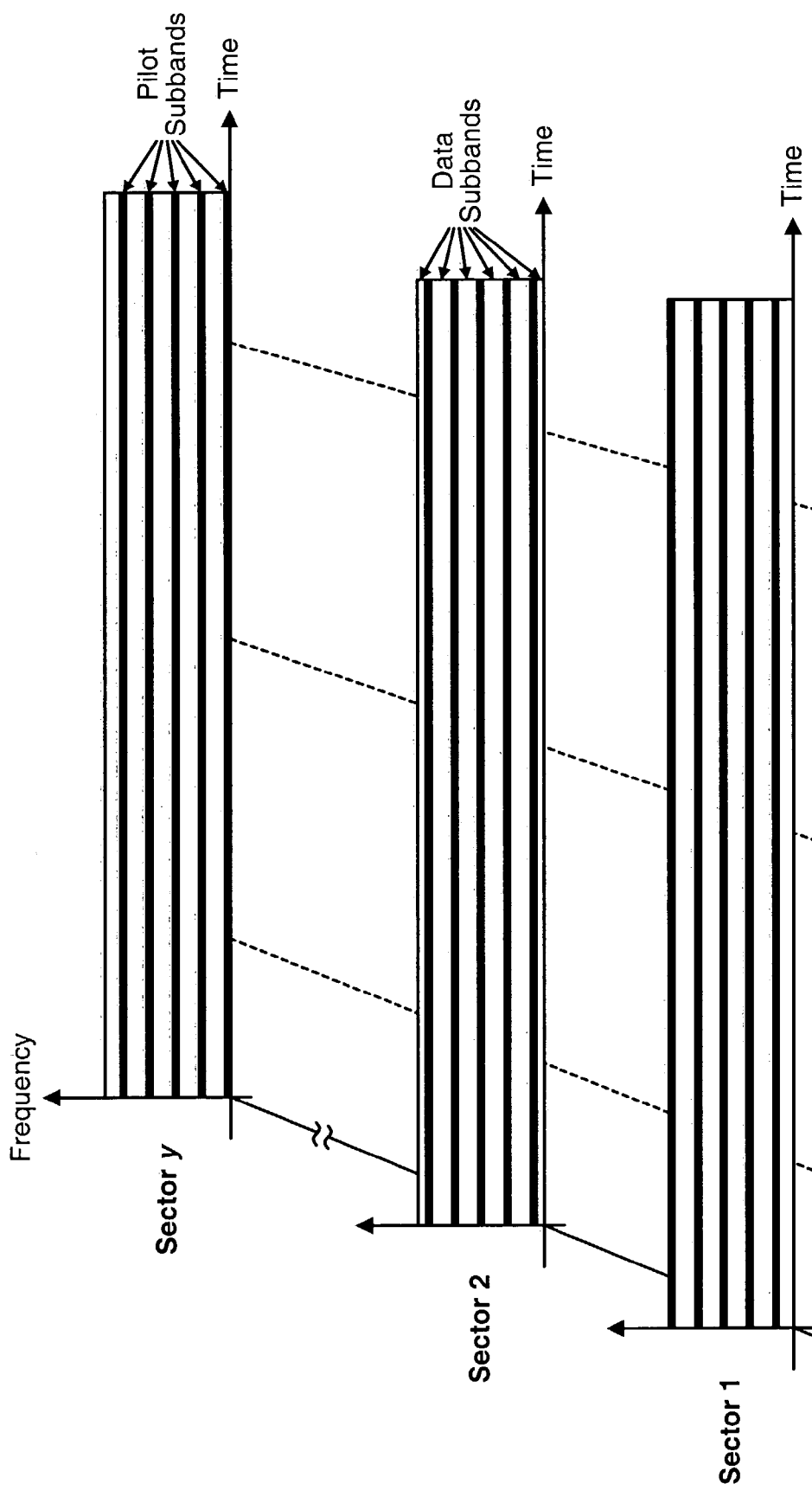

FIG. 6B shows the transmission of pilots from multiple sectors for the synchronous continuous pilot transmission scheme. For this scheme, the sectors continuously transmit their pilots on disjoint sets of subbands. Each sector may transmit data on other subbands not designated for pilot transmission. As indicated in FIG. 6B, the timing of the sectors is synchronized.

For an asynchronous burst pilot transmission scheme, the sectors in the system transmit their pilots in bursts in designated time slots and using disjoint sets of pilot subbands. The sectors within each cell may further orthogonalize their pilots by use of different orthogonal codes. However, because the cells are not synchronized, the pilots from different cells may arrive at different times at a terminal, which would need to perform a search for these pilot bursts. Moreover, because the cells are not synchronized, data transmission from sectors in one cell can interfere with pilot transmission from sectors in other cells, and vice versa.

For an asynchronous continuous pilot transmission scheme, the sectors and cells in the system are not synchronized, and each sector continuously transmits its pilots on a designated set of pilot subbands. Again, the sectors within each cell may orthogonalize their pilots by use of different orthogonal codes. Because the cells are not synchronized, a terminal would need to determine the timing of each sector to be recovered.

For the synchronous burst pilot transmission scheme, the pilot for each sector experiences minimum degradation from co-channel interference, i.e., interference from other sectors assigned with the same set of pilot subbands and orthogonal code. For the synchronous continuous pilot transmission scheme, the pilot for each sector experiences degradation caused by co-channel interference due to data transmission on the pilot subbands by adjacent sectors. For the asynchronous burst/continuous pilot transmission schemes, the pilot for each sector experiences degradation from co-channel interference due to data transmission plus inter-carrier interference caused by non-synchronous OFDM symbol timing, where the inter-carrier interference is not present in the absence of multipath.

The receiver processing at a terminal for each of these pilot transmission schemes is described in further detail below.

Regardless of the pilot transmission scheme selected for use, the pilot subbands may be assigned to the sectors in various manners. In one embodiment, the set of subbands assigned to each sector for pilot transmission is fixed. In another embodiment, each sector transmits its pilots on different sets of subbands at different time intervals. This embodiment may allow the terminals to obtain better estimates of the channel to the sector.

III. System

Figure 7:
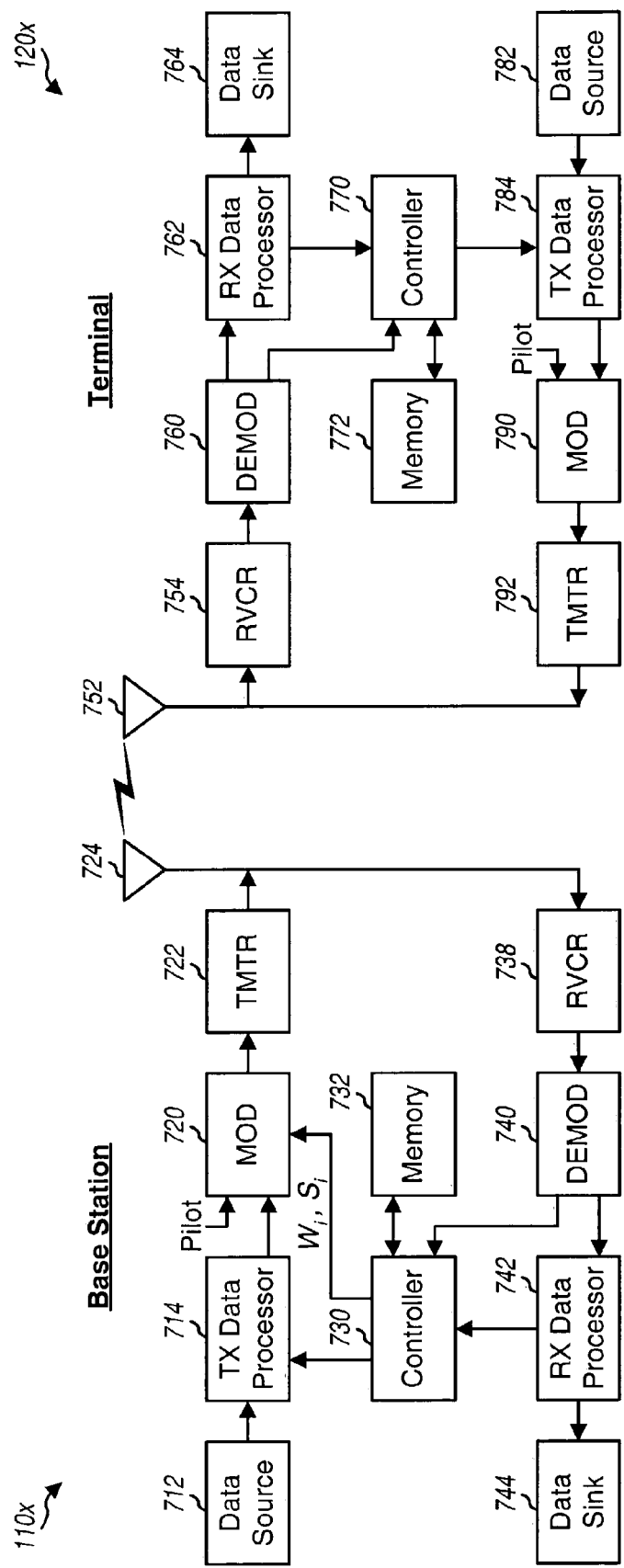
FIG. 7 shows a block diagram of a base station and a terminal.

FIG. 7 shows a block diagram of an embodiment of a base station 110x and a terminal 120x in multi-carrier communication system 100. For simplicity, base station 110x performs processing for one sector and includes one antenna.

On the downlink, at base station 110x, a transmit (TX) data processor 714 receives traffic data from a data source 712 and signaling and other data from a controller 730. TX data processor 714 formats, codes, interleaves, and modulates (i.e., symbol maps) the data to provide data modulation symbols, or simply data symbols. A modulator (MOD) 720 receives and multiplexes the data symbols with pilot symbols, performs the required processing, and provides a stream of OFDM symbols. The processing by modulator 720 is described below. A transmitter unit (TMTR) 722 then processes the OFDM symbol stream to provide a downlink signal, which is then transmitted from an antenna 724 to the terminals.

At terminal 120x, the downlink signals transmitted by multiple base stations for multiple sectors are received by an antenna 752. The received signal is processed (e.g., amplified, filtered, frequency downconverted, and digitized) by a receiver unit (RCVR) 754 to provide samples. A demodulator (DEMOD) 760 then processes the samples in a manner complementary to that performed by modulator 720 to provide pilot strength estimates and data symbol estimates for the sector(s) being recovered. A receive (RX) data processor 762 further processes (e.g., symbol demaps, deinterleaves, and decodes) the data symbol estimates to provide decoded data, which may be provided to a data sink 764 for storage and/or a controller 770 for further processing.

The processing for the uplink may be the same or different from the processing for the downlink. Data and signaling are processed (e.g., coded, interleaved, and modulated) by a TX data processor 784 to provide data symbols, which are multiplexed with pilot symbols and further processed by a modulator 790 to provide transmit symbols. Modulator 790 may perform OFDM processing, CDMA processing, and so on, depending on the particular modulation technique used for the uplink. A transmitter unit 792 further processes the transmit symbols to generate an uplink signal, which is then transmitted from antenna 752.

At base station 110x, the uplink signals from terminals are received by antenna 724, and the received signal is processed by a receiver unit 738 to provide samples. The samples are further processed by a demodulator 740 to provide data symbol estimates, which are further processed by an RX data processor 742 to provide decoded data for each terminal being recovered. The decoded data may be provided to a data sink 744 for storage and/or controller 730 for further processing.

Controllers 730 and 770 control the operation of various processing units at the base station and terminal, respectively. Memory units 732 and 772 store data and program codes used by controllers 730 and 770, respectively.

1. Base Station Pilot Processing

Figure 8:
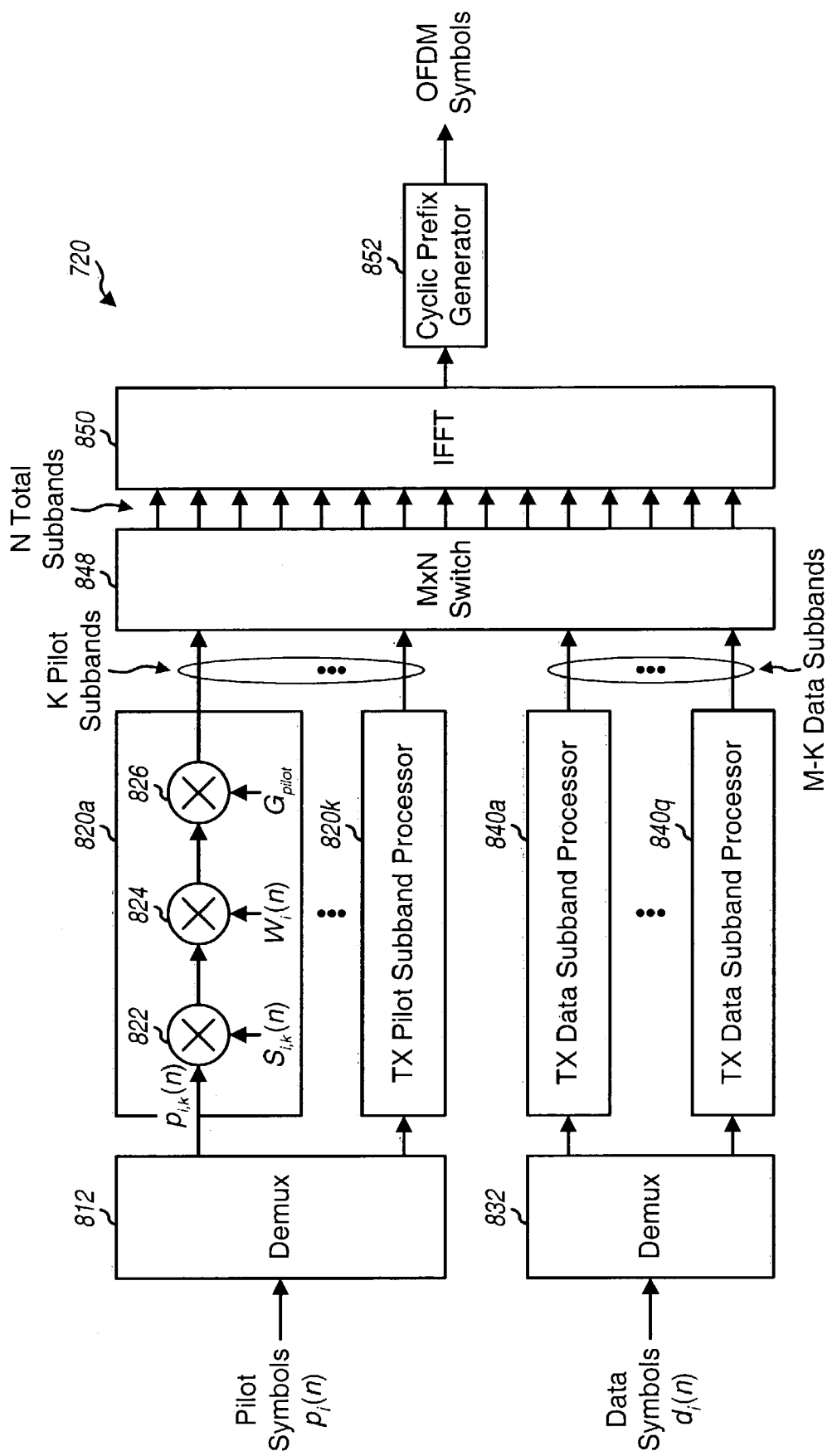
FIG. 8 shows a block diagram of a modulator within the base station.

FIG. 8 shows a block diagram of an embodiment of modulator 720. In this embodiment, pilot transmission occurs on a set of K pilot subbands assigned to the i-th sector. The pilot symbols are covered with an $N_W$-chip Walsh code $W_i(n)$ and scrambled with a scrambling code $S_i(n)$ that are assigned to the i-th sector.

In general, the same pilot symbol may be used for all pilot subbands or different pilot symbols may be used for different pilot subbands. A pilot symbol is a modulation symbol derived based on a particular modulation scheme (e.g., BPSK, QPSK, or M-QAM), i.e., a complex value corresponding to a point in a signal constellation for the modulation scheme. Moreover, the same pilot symbols may be used by all sectors or different pilot symbols may be used by different sectors. In one embodiment, a specific set of M pilot symbols is defined for the M usable subbands in the system. The pilot symbols used by each sector is then dependent on the set of pilot subbands assigned to that sector. Regardless, the terminals in the system have a priori knowledge of the pilot symbols used by the sectors in the system.

Within modulator 720, the pilot symbols $p_i(n)$ to be transmitted by the i-th sector are provided to a demultiplexer (Demux) 812 and demultiplexed into K pilot symbol substreams for the K pilot subbands. For each OFDM symbol period, the same pilot symbol may be transmitted on all K pilot subbands or a set of K pilot symbols may be transmitted on the K pilot subbands. In any case, each of the K pilot symbol substreams is provided to a respective TX pilot subband processor 820 that processes the pilot symbols for its assigned pilot subband.

Within each TX pilot subband processor 820, the pilot symbols $p_{i,k}(n)$ for the assigned k-th pilot subband are provided to a complex multiplier 822 and multiplied with a scrambling code segment $S_{i,k}(n)$ for the k-th pilot subband. The scrambling may be performed in various manners. For example, the scrambling may be such that each scrambling code chip is applied to (1) the entire Walsh sequence $W_i(n)$ for each of the K pilot subbands (for the first scrambling scheme described above), (2) one Walsh code chip in one pilot subband (for the second scrambling scheme described above), (3) one Walsh code chip for all K pilot subbands, or (4) some other combination of Walsh code chip(s) and pilot subband(s).

The K segments of scrambling code chips used by the K TX pilot subband processors 820a through 820k may thus be the same or different depending on the particular scrambling scheme being implemented. For the first scrambling scheme, the same scrambling code sequence is used for each of the K pilot subbands, and each scrambling code chip is applied to $N_W$ consecutive pilot symbols by maintaining the scrambling code chip constant for $N_W$ consecutive OFDM symbol periods. For the second scrambling scheme, the scrambling sequence $S_i(n)$ is divided into K scrambling code segments (e.g., as described above for the second scrambling scheme), one segment for each of the K pilot subbands. Each scrambling code chip is then applied to one pilot symbol for one pilot subband.

The scrambled pilot symbols from multiplier 822 are then provided to a multiplier 824 and covered with the Walsh code $W_i(n)$. The covering is performed by multiplying $N_W$ scrambled pilot symbols to be transmitted in $N_W$ consecutive OFDM symbol periods with the $N_W$ chips of the Walsh code $W_i(n)$, where $N_W=4$ for the exemplary Walsh codes shown in Table 3. The covered pilot symbols are then scaled by a multiplier 826 with a gain $G_{pilot}$, which determines the amount of transmit power to use for pilot transmission. Typically, the total transmit power $P_{total}$ for each sector or each antenna is constrained, for example, by regulatory requirements and/or limitations of the power amplifier. A portion of this total transmit power $P_{total}$ is allocated for pilot transmission and the remaining power may be used for data transmission. The amount of power used for pilot transmission, $P_{pilot}$, may be selected to expedite pilot detection/acquisition by the terminals in the sector while minimizing pilot interference to data transmission by other sectors. The pilot power $P_{pilot}$ may be fixed for variable, and the gain $G_{pilot}$ is determined based on the pilot power $P_{pilot}$. The processed pilot symbols from the K TX pilot subband processors 820*a* through 820*k* are then provided to an M×N switch 848.

The data symbols $d_i(n)$ to be transmitted by the i-th sector are provided to a demultiplexer 832 and demultiplexed into up to (M–K) data symbol substreams for the up to (M–K) subbands to be used for data transmission. Each data symbol is also a modulation symbol derived based on a particular modulation scheme (e.g., BPSK, QPSK, or M-QAM). The same or different modulation schemes may be used for the pilot and data symbols. Each data symbol substream is provided to a respective TX data subband processor 840 that processes the data symbols for the assigned data subband. Each processor 840 may perform Walsh covering, scrambling, scaling, some other processing, or no processing at all. The processed data symbols from the (M–K) data subband processors 840*a* through 840*q* are also provided to switch 848.

Switch 848 orders the processed pilot symbols from K TX pilot subband processors 820 and the processed data symbols from (M–K) TX data subband processors 840 such that these symbols are provided to their designated pilot and data subbands. Switch 848 also provides a signal value of zero for each unused subband. For each OFDM symbol period, switch 848 provides to an inverse fast Fourier transform (IFFT) unit 850 a set of N output symbols (comprised of processed pilot and data symbols and zeros) for the N total subbands.

Within IFFT unit 850, the N symbols' for each OFDM symbol period are transformed to the time domain using an inverse fast Fourier transform to obtain a "transformed" symbol that comprises N time-domain samples. To combat inter-symbol interference (ISI) caused by frequency selective fading, a portion of each transformed symbol is repeated by a cyclic prefix generator 852 to form a corresponding OFDM symbol that comprises $N+C_p$ samples, where $C_p$ is the number of samples being repeated. The repeated portion is often referred to as a cyclic prefix. An OFDM symbol period corresponds to the duration of one OFDM symbol. Cyclic prefix generator 852 provides a stream of OFDM symbols for transmission over one antenna.

If the sector is equipped with multiple antennas, then the same pilot processing shown in FIG. 8 may be performed for each of the antennas. In particular, the pilot symbols for each antenna is covered with the Walsh code, scrambled with the scrambling code, and multiplexed onto the set of K pilot subbands assigned to that antenna. Depending on the specific pilot transmission scheme being implemented, the same or different Walsh codes may be assigned to the multiple antennas, the same or different scrambling codes may be used for the antennas, and the same or different sets of subbands may be used for the antennas. The data symbols may be processed in accordance with the STTD or Alamouti scheme for transmission over multiple antennas, as described in the aforementioned provisional U.S. patent application Ser. No. 60/421,309.

2. Terminal Pilot Processing

Figure 9A:
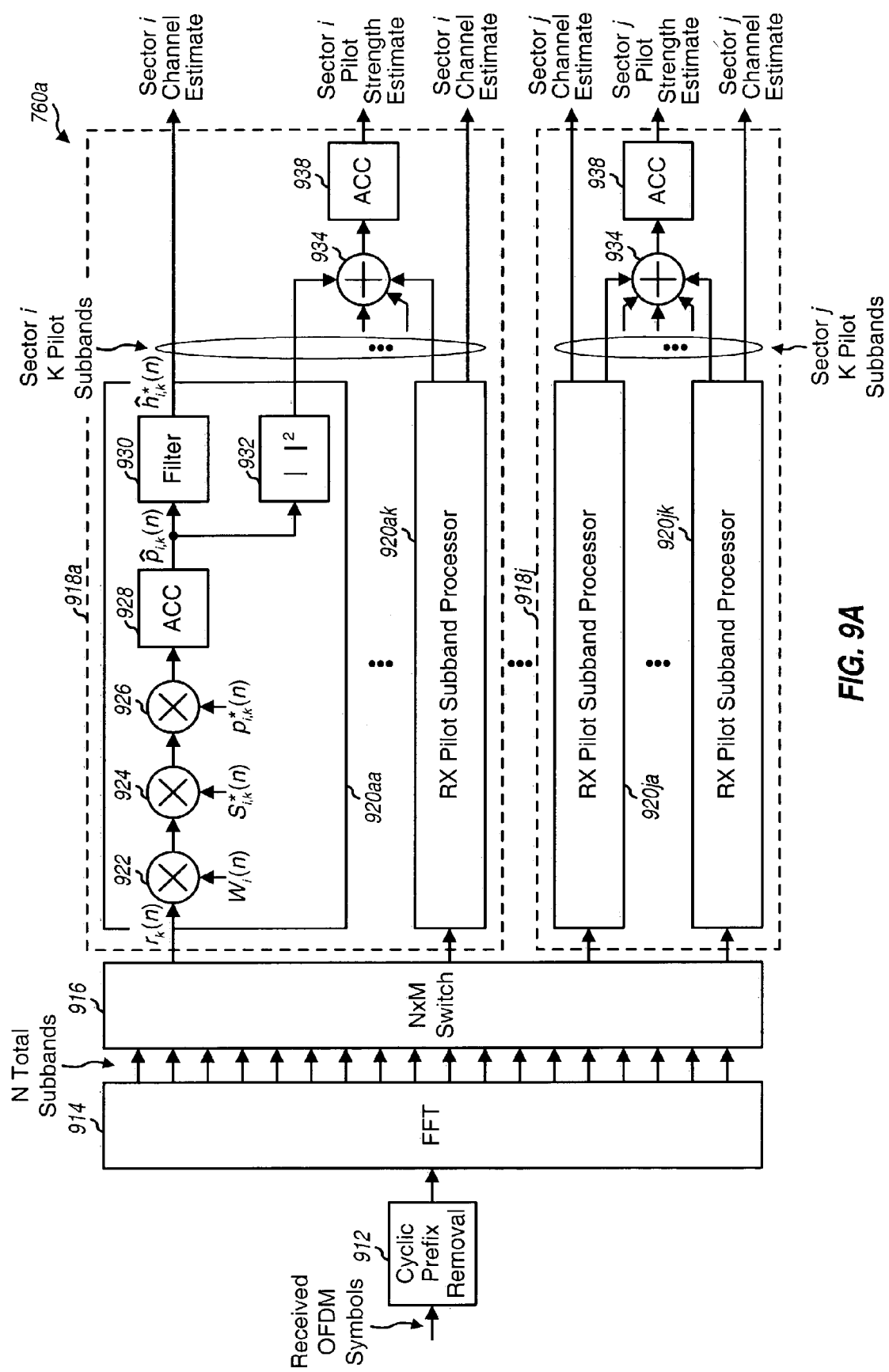
FIGS. 9A and 9B shows block diagrams of two embodiments of a demodulator within the terminal.

FIG. 9A shows a block diagram of an embodiment of a demodulator 760*a*, which may be used for the synchronous burst pilot transmission scheme described above whereby the sectors transmit their pilots in bursts at designated time slots. For each pilot burst, demodulator 760*a* may perform the processing to recover the pilots transmitted from multiple sectors.

Within demodulator 760*a*, the received OFDM symbols are provided to a cyclic prefix removal unit 912, which removes the cyclic prefix appended to each OFDM symbol to obtain a corresponding received transformed symbol. An FFT unit 914 then transforms each received transformed symbol to the frequency domain to obtain N received symbols for the N total subbands. An N×M switch 916 provides the received symbols for each set of K pilot subbands to a respective set 918 of K RX pilot subband processors 920*aa* through 920*ak*, one processor 920 for each pilot subband in the set. For the synchronous burst pilot transmission scheme, pilots are received from multiple sectors on disjoint sets of subbands. A set of RX pilot subband processors may then be used to perform the pilot processing for each sector to be recovered. Since multiple sectors (e.g., from different cells or clusters) may transmit on the same subband set with different orthogonal codes, multiple sets of RX pilot subband processors may also be used to process a given set of pilot subbands. For simplicity, only one set of RX pilot subband processors is shown in FIG. 9A for each set of pilot subbands.

The pilot processing by the terminal is complementary to the pilot processing performed by the sector and is further dependent on the characteristics of the channel. For improved pilot detection performance and better discrimination of the pilots transmitted by different sectors, it is desirable to perform coherent integration over as many OFDM symbol periods and as many pilot subbands as possible. However, the amount of coherent integration that may be performed in the time domain and the frequency domain is dependent on the coherence time and the coherence bandwidth, respectively, of the channel. In particular, the duration of coherent integration (i.e., the number of OFDM symbols over which coherent integration may be performed) should be less than the coherence time of the channel (i.e., the time duration over which the channel is essentially constant). Moreover, the frequency span encompassing the subbands that may be coherently added should be less than the coherent bandwidth of the channel. The coherent bandwidth is the band in which the channel is essentially constant and is related to the delay spread of the channel.

The pilot processing shown in FIG. 9A performs coherent integration over a single Walsh symbol period and a single pilot subband. For simplicity, the pilot processing for a given sector i is described below. Within each RX pilot subband processor 920 used for sector i, the received symbols $r_k(n)$ for the assigned k-th pilot subband are provided to a multiplier 922 and multiplied with the Walsh code $W_i(n)$ for sector i. The decovered symbols are then provided to a complex multiplier 924 and multiplied with the complex conjugate of the scrambling code chips, $S^*_{i,k}(n)$, used for the k-th subband in the n-th OFDM symbol period by sector i. The descrambling is performed in a manner that is complementary to the scrambling performed by sector i. For the first scrambling scheme, each scrambling code chip is applied to $N_W$ consecutive decovered symbols by maintaining the scrambling code chip constant for $N_W$ consecutive OFDM symbol periods. For the second scrambling scheme, one scrambling code segment is used for each of the K pilot subbands, and each scrambling code chip is applied to one decovered symbol from multiplier 922 in one pilot subband. The descrambled symbols from multiplier 924 are then provided to a complex multiplier 926 and multiplied with the complex conjugate of the pilot symbols, $p_{i,k}^*(n)$, transmitted on the k-th subband in the n-th OFDM symbol period by sector i. The outputs from multiplier 926 are then accumulated over each Walsh symbol period by an accumulator (ACC) 928 to provide a pilot estimate $\hat{p}_{i,k}(n)$ for that Walsh symbol period.

Multipliers 922, 924, and 926 operate at the OFDM symbol rate (i.e., $1/T_{sym}$). Accumulator 928 performs accumulation at the OFDM symbol rate, but provides a pilot estimate for each Walsh symbol period and is also cleared at the start of each Walsh symbol period. Filter 930 and unit 932 operate at the Walsh symbol rate (i.e., $1/T_W$, or $\frac{1}{4}T_{sym}$ for 4-chip Walsh sequence).

The pilot estimates $\hat{p}_{i,k}(n)$ from accumulator 928 may further be filtered by a filter 930 to provide an estimate $\hat{h}_{i,k}(n)$ of the channel for the k-th pilot subband to sector i. Filter 930 may be implemented with an accumulator, a finite impulse response (FIR) filter, an infinite impulse response (IIR) filter, or some other type of filter. A unit 932 computes the squared magnitude of the pilot estimates $\hat{p}_{i,k}(n)$ from accumulator 928 to provide a pilot strength estimate $|\hat{p}_{i,k}(n)|^2$ for the assigned k-th subband for sector i.

For each OFDM symbol period of pilot transmission, a summer 934 receives and sums the pilot strength estimates $|\hat{p}_{i,k}(n)|^2$ for all K pilot subbands for sector i to obtain a pilot strength estimate $|\hat{p}_i(n)|^2$ for that OFDM symbol period. An accumulator 938 then accumulates the pilot strength estimates $|\hat{p}_i|^2$ for a portion or the entire pilot transmission interval to provide a final pilot strength estimate $|\hat{p}_i|^2$ for sector i. For example, accumulator 938 may perform accumulation over an entire pilot burst. Accumulator 928 performs coherent integration and accumulator 938 performs non-coherent integration.

Coherent integration may also be performed over multiple Walsh symbol periods, if permitted by the coherence time of the wireless channel. In this case, pilot estimates for multiple Walsh symbol periods may be accumulated (e.g., by accumulator 928), and the resultant estimate may be provided to filter 930 and unit 932. Coherent integration may also be performed over multiple pilot subbands (e.g., some or all K pilot subbands), if permitted by the coherence bandwidth of the wireless channel. In this case, pilot estimates from accumulator 928 for multiple pilot subbands may be accumulated (e.g., by another accumulator not shown in FIG. 9), magnitude squared, and provided to summer 934. The frequency span encompassing the pilot subbands over which coherent integration can be performed should be less than the coherence bandwidth of the wireless channel. Coherent integration in the frequency domain may be performed to obtain an improved pilot strength estimate, but the channel estimates are normally obtained for individual subbands. Coherent integration may also be performed over multiple Walsh symbol periods and multiple pilot subbands, if permitted by the coherence time and the coherence bandwidth of the wireless channel, to provide an improved pilot strength estimate.

The pilot processing described above provides channel estimates for the K pilot subbands for sector i. Channel estimates for the remaining M–K subbands for sector i may be obtained based on (e.g., by interpolating) the channel estimates for the K pilot subbands sector i. A technique for estimating the channel estimates for all M subbands based on channel estimates for K subbands is described in U.S. patent application Ser. No. 60/422,362, entitled "Channel Estimation for OFDM Communication Systems," filed Oct. 29, 2002, and U.S. patent application Ser. No. 60/427,896, entitled "Reduced Complexity Channel Estimation for Wireless Communication Systems," filed Nov. 19, 2002, both of which are assigned to the assignee of the present application and incorporated herein by reference. The channel estimates may be used for data demodulation and possibly other purposes.

The channel estimates for all or a subset of the M usable subbands for sector i may be used to perform coherent data demodulation for a data transmission received from sector i. Channel estimates may also be obtained for multiple sectors in the systems. For each sector, the pilot processing is performed with the Walsh sequence $W_i(n)$, scrambling code $S_i(n)$, and pilot symbols $p_i(n)$ used by that sector.

The pilot processing described above also provides a pilot strength estimate for sector i. Pilot strength estimates may be obtained for multiple sectors in the systems. The pilot strength estimates for multiple sectors may be used to determine the best sector to receive data transmission, to hand off from one sector to another sector (e.g., for a mobile terminal), and possibly for other purposes.

For the synchronous burst pilot transmission scheme, demodulator 760a performs pilot processing only during the time intervals when pilots are transmitted by the sectors. The channel estimates for one or multiple sectors may be used to perform coherent data demodulation of data transmission received from one or multiple sectors during the time period between pilot bursts.

FIG. 9A shows an exemplary pilot processing technique that may be performed by the terminal. Other pilot processing techniques may also be used, and this is within the scope of the invention. For simplicity, only the pilot processing is shown for demodulator 760a in FIG. 9A. The data processing may be performed by demodulator 760a in the manner described below.

Figure 9B:
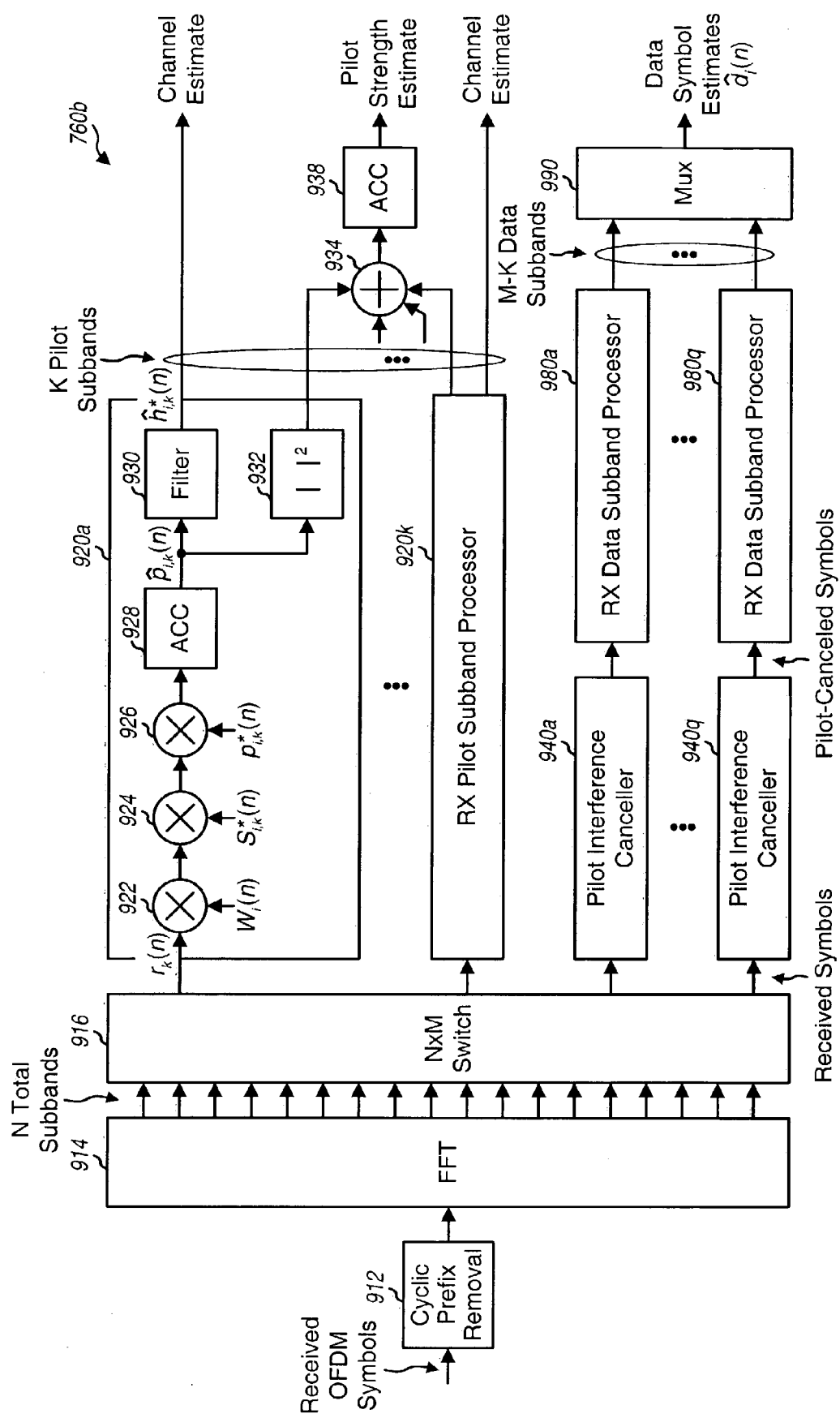

FIG. 9B shows a block diagram of an embodiment of a demodulator 760b, which may be used for the synchronous continuous pilot transmission scheme described above whereby each sector continuously transmits its pilot in a designated set of pilot subbands and data on remaining subbands. In the following description, demodulator 760b recovers the pilot and data transmitted by a given sector i.

Within demodulator 760b, the received OFDM symbols are processed by cyclic prefix removal unit 912 and FFT unit 914 in the manner described above. Switch 916 then provides the received symbols for the K pilot subbands to K RX pilot subband processors 920a through 920k and the received symbols for M−K remaining subbands to M−K pilot interference cancellers 940*a* though 940*q*.

Each RX pilot subband processors 920 performs the pilot processing for one pilot subband for sector i in the manner described above for FIG. 9A. However, since the pilot subbands for sector i may be used as data subbands by other sectors, coherent integration may be performed over a longer time interval (e.g., multiple Walsh symbol periods) to cancel the interference due to data symbols from other sectors so that more accurate pilot estimates $\hat{p}_{i,k}(n)$ may be obtained. The coherent integration time interval is dictated by, and should be less than, the coherence time of the channel.

Within each RX pilot subband processors 920, multipliers 922, 924, and 926 operate at the OFDM symbol rate (i.e., $1/T_{sym}$) and perform multiplication with the Walsh sequence $W_i(n)$, the scrambling code $S_i(n)$, and the pilot symbols $p_i(n)$ used by sector i. Accumulator 928 operates at the OFDM symbol rate and accumulates the outputs from multiplier 926 over one or (preferably) multiple Walsh symbol periods to provide a pilot estimate $\hat{p}_{i,k}(n)$ for each accumulation interval. Filter 930 operates at the accumulation rate and filters the pilot estimate $\hat{p}_{i,k}(n)$ to provide a channel estimate $\hat{h}_i(k)$ for the k-subband of sector i. The channel estimates for all K pilot subbands may further be processed (e.g., interpolated) to obtain channel estimates for data subbands, as described above. Unit 932, summer 934, and accumulator 938 operate at the accumulation rate and provide a pilot strength estimate $|\hat{p}_i|^2$ for sector i.

For a continuous pilot transmission scheme, demodulator 760*b* may perform pilot processing at all times during a communication session. The channel estimates for sector i may be used to perform coherent data demodulation of a data transmission received on the data subbands from sector i. The data processing may be performed as described below.

For simplicity, only one set of K RX pilot subband processors 920 and one set of M−K pilot interference cancellers 940 are shown in FIG. 9B. Demodulator 760*b* may also be designed with multiple sets of RX pilot subband processors and multiple sets of M−K pilot interference cancellers to concurrently process pilot and data transmissions from multiple sectors.

Demodulators 760*a* and 760*b* may also be used to perform pilot processing for the asynchronous burst/continuous pilot transmission schemes described above. If the sectors are asynchronous, then the terminal would need to determine the timing of each sector to be recovered. This may be achieved by using a sliding correlator, similar to the one used for CDMA systems. The processing for each sector would then be performed in accordance with the timing of that sector. In particular, the FFT operation, decovering with the Walsh sequence $W_i(n)$, and descrambling with the scrambling code $S_i(n)$ are all performed in accordance with the timing for the sector to be recovered. Moreover, coherent integration may be performed over a longer time period (e.g., multiple Walsh symbol periods) to cancel the interference due to data symbols transmitted by other sectors such that more accurate pilot estimates $\hat{p}_{i,k}(n)$ may be obtained for the sector to be recovered.

For the asynchronous burst pilot transmission scheme, the pilot processing for each sector may be performed (1) at time intervals when the pilot is transmitted by the sector and (2) based on the timing for that sector. For the asynchronous continuous pilot transmission scheme, the pilot processing for each sector may be performed at all times based on the timing for that sector.

3. Terminal Pilot Interference Cancellation

As described above, the pilot transmissions from the sectors in the system may be such that the subbands used for pilot transmission by a given sector i may also be used for pilot transmissions by other sectors. For this sector i, the pilot transmissions from other sectors on its pilot subbands represents interference that, if effectively canceled, can result in improved channel estimates and pilot strength estimate for sector i. Moreover, the subbands used for data transmission by sector i may also be used for pilot transmissions by other sectors (e.g., for the continuous pilot transmission schemes). For this sector i, the pilot transmissions from other sectors on its data subbands represents interference that, if effectively canceled, can result in improved data performance.

For example, a terminal may be receiving data transmission from Sector 1 whose pilots are transmitted on subband set 1 (e.g., subbands 10, 20, 30, . . . 500, for the exemplary OFDM system shown in Table 2 and FIG. 2B). The terminal also has knowledge of the pilots transmitted by other sectors. Some of these other pilots will not be transmitted on subband set 1. For example, a neighboring Sector 2 may transmit pilots on subband set 2 (e.g., subbands 11, 21, 31, . . . , 501). Typically, Sector 1 transmits data to terminals in its coverage area using almost all of the usable subbands that are not in subband set 1. Therefore, the subbands in set 2 (which are used for pilot transmission by Sector 2) may be used as data subbands by Sector 1. The pilot transmission on the subbands in set 2 by Sector 2 will then act as interference to the data transmission on these same subbands by Sector 1.

The terminal typically has knowledge of the pilot transmission on subband set 2 by Sector 2. The terminal can then estimate the pilot interference from Sector 2 on the subbands in set 2. The pilot interference estimates may be obtained by (1) estimating the channel from Sector 2 to the terminal for each of the subbands in set 2, (2) generating processed (i.e., scrambled and covered) pilot symbols for each subband in set 2 in the same manner as performed by Sector 2, and (3) scaling these processed pilot symbols with the channel estimate. The pilot interference estimate for each subband in set 2 for Sector 2 is then subtracted from the received symbols for the same subband to obtain the pilot-canceled symbols for that subband.

In general, pilot interference cancellation may be performed whenever subbands used for downlink pilot or data transmission by one sector are also used for downlink pilot transmission by another sector, with the pilot being known to the terminal. Typically, the terminal will have knowledge of the pilots transmitted by other sectors because this information is used to facilitate terminal-assisted handoff between the sectors. The terminal typically measures the power of the pilot received from its current serving sector and the pilots received from other nearby sectors that are candidates for handoff. The pilot power measurements may then be used by the terminal to request a handoff to a better serving sector.

Pilot interference cancellation may be performed for a pilot subband to obtain a higher quality pilot estimate having interference due to pilots from other sectors removed. For example, for the synchronous burst pilot transmission scheme, all sectors transmit their pilots at the same time, in which case pilot interference cancellation may be performed to obtain improved channel estimates for a selected sector. Pilot interference cancellation may also be performed for a data subband to obtain a higher quality data symbol estimate having interference due to pilots from other sectors removed. For clarity, pilot interference cancellation is described below for a data subband.

Referring back to FIG. 9B, the received symbols for each of the (M−K) data subband are provided to a respective pilot interference canceller 940. Each canceller 940 estimates the pilot interference received by the terminal from each of the interfering sectors that have been designated for cancellation. Each canceller 940 then (1) obtains the total pilot interference estimates for all designated interfering sectors and (2) cancels the total pilot interference estimates from the received symbols to provide the pilot-canceled symbols for the assigned data subband.

Figure 10:
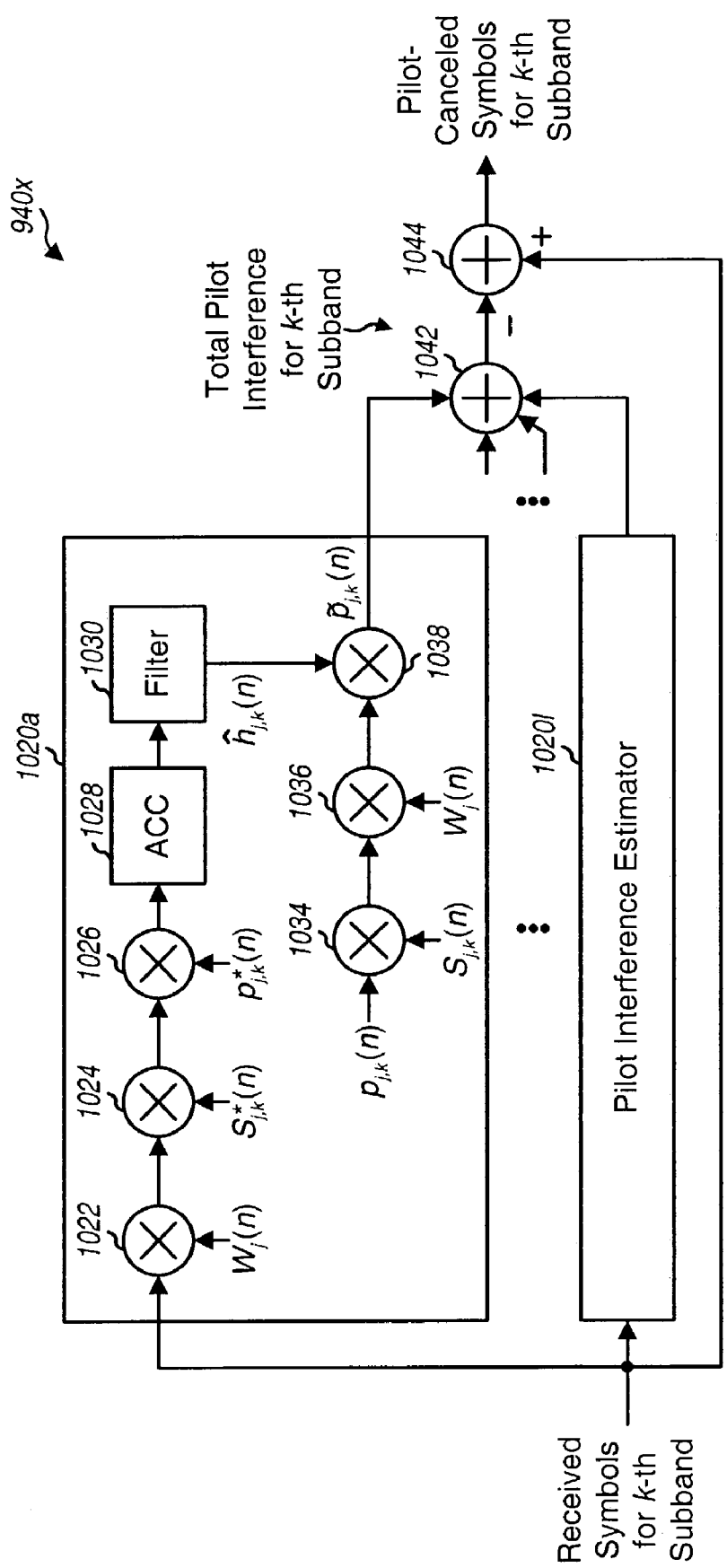
FIG. 10 shows a block diagram of a pilot interference canceller within the demodulator.

FIG. 10 shows a block diagram of an embodiment of pilot interference canceller 940x, which may be used for each of pilot interference cancellers 940a through 940q in FIG. 9. The pilot interference cancellation is performed in the frequency domain, after the fast Fourier transform. Canceller 940x performs pilot interference cancellation for one data subband.

Within pilot interference canceller 940x, the received symbols for the assigned subband are provided to L pilot interference estimators 1020a through 1020l, where L may be any integer zero or greater. Each estimator 1020 estimates the pilot interference on an assigned k-th subband from an assigned j-th interfering sector and provides the pilot interference estimate $\tilde{p}_{j,k}(n)$ for its assigned subband and sector.

Within each estimator 1020, the received symbols $r_k(n)$ for the assigned k-th subband are provided to a multiplier 1022 and multiplied with the Walsh code $W_j(n)$ used by the j-th interfering sector. The output of multiplier 1022 is then multiplied by a complex multiplier 1024 with the complex conjugate of the scrambling code chips, $S^*_{j,k}(n)$, used for the k-th subband by the j-th interfering sector. The descrambled symbols from multiplier 1024 are then multiplied by a multiplier 1026 with the complex conjugate of the pilot symbols, $p^*_{j,k}(n)$, transmitted on the k-th subband by the j-th interfering sector.

The outputs from multiplier 1026 are then accumulated over each Walsh symbol period by an accumulator 1028 to provide a pilot estimate $\hat{p}_{j,k}(n)$ for the k-th subband in that Walsh symbol period. The pilot estimates from accumulator 1028 are further filtered by a filter 1030 to provide a channel estimate $\hat{h}_{j,k}(n)$ for the j-th interfering sector for the k-th subband. Filter 1030 may be implemented with an accumulator, a FIR filter, or an IIR filter. The response of filter 1030 (e.g., the duration of accumulation) may be dependent on the rate of channel fading.

To derive the pilot interference estimates $\tilde{p}_{j,k}(n)$ for the j-th interfering sector, the pilot symbols $p_{j,k}(n)$ used by the j-th sector are (1) multiplied with the scrambling code chips $S_{j,k}(n)$ by a multiplier 1034, (2) covered with the Walsh code $W_j(n)$ by a multiplier 1036, and (3) multiplied with the channel estimate $\hat{h}_{j,k}(n)$ by a multiplier 1038. The pilot interference estimates from all assigned estimators 1020 are then summed by a summer 1042 to obtain the total pilot interference estimates $\tilde{p}_k(n)$ for the k-th subband. The total pilot interference estimates $\tilde{p}_k(n)$ are then subtracted from the received symbols $r_k(n)$ by a summer 1044 to obtain the pilot-canceled symbols for the k-th subband.

Referring back to FIG. 9, the pilot-canceled symbols from pilot interference cancellers 940a through 940q for the M−K data subbands are provided to M−K RX data subband processors 980a through 980q, respectively. Each processor 980 processes the pilot-canceled symbols for the assigned data subband in a manner that is complementary to that performed by processor 840 in FIG. 8. Each processor 980 may also perform coherent data demodulation by computing a dot product of the pilot-canceled symbols with the channel estimate for the assigned data subband to provide data symbol estimates $\hat{d}_{i,k}(n)$, which are estimates of the data symbols transmitted on that subband. The channel estimates for the data subbands for the i-th sector being recovered may be derived based on the channel estimates obtained for the pilot subbands (e.g., using interpolation).

A multiplexer 990 then receives and multiplexes the data symbol estimates from RX data subband processors 980a through 980q to provide the data symbol estimates $\hat{d}_i(n)$ for the i-th sector being recovered.

The pilot interference cancellation technique described above may be straightforwardly extended to the case of multiple receive antennas at the terminal. In this case, the same pilot processing may be performed for the received signal obtained from each terminal antenna. The pilot-canceled symbols for each antenna may further be coherently demodulated with the channel estimate to provide data symbol estimates for that antenna. The data symbol estimates from all antennas may then be weighted and combined to provide the final data symbol estimates, which may then be decoded.

The pilot transmission and pilot interference cancellation techniques described herein may be implemented by various means. For example, the processing for pilot transmission at the access point and the processing for pilot detection and pilot interference cancellation at the terminal may be implemented in hardware, software, or a combination thereof. For a hardware implementation, the elements used to process the pilots for transmission/reception and for pilot interference cancellation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the processing for pilot transmission/ reception and pilot interference cancellation may be implemented with modules (e.g., procedures, functions, and so on) that perform the functions described herein. The software codes may be stored in a memory unit (e.g., memory units 732 and 772 in FIG. 47 and executed by a processor (e.g., controllers 730 and 770). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting a pilot on a downlink in a wireless multi-carrier communication system, comprising:
generating pilot symbols for transmission on a first set of subbands, wherein the first set of subbands is used for pilot transmission by a first transmitting entity and is disjoint from a second set of subbands used for pilot transmission by a second transmitting entity, and wherein each pair of adjacent subbands in the first set encompasses a frequency span that is less than or equal to a coherence bandwidth of a wireless channel in the system;
processing the pilot symbols to obtain a pilot signal having the pilot symbols included in the first set of subbands; and
transmitting the pilot signal from the first transmitting entity.

2. The method of claim 1, further comprising:
processing the pilot symbols with an orthogonal code to obtain covered pilot symbols, and wherein the covered pilot symbols are further processed to obtain the pilot signal.

3. The method of claim 1, further comprising:
processing the pilot symbols with a scrambling code to obtain scrambled pilot symbols, and wherein the scrambled pilot symbols are further processed to obtain the pilot signal.

4. The method of claim 1, wherein the subbands in the first set are evenly distributed across a plurality of subbands usable for pilot and data transmission by the first transmitting entity.

5. The method of claim 1, wherein pilot signals are transmitted in bursts from the first and second transmitting entities.

6. The method of claim 1, wherein pilot signals are transmitted with synchronous timing from the first and second transmitting entities.

7. The method of claim 1, wherein the multi-carrier communication system implements orthogonal frequency division multiplexing (OFDM).

8. An apparatus in a wireless multi-carrier communication system, comprising:
means for generating pilot symbols for transmission on a first set of subbands, wherein the first set of subbands is used for pilot transmission by a first transmitting entity and is disjoint from a second set of subbands used for pilot transmission by a second transmitting entity, and wherein each pair of adjacent subbands in the first set encompasses a frequency span that is less than or equal to a coherence bandwidth of a wireless channel in the system;
means for processing the pilot symbols to obtain a pilot signal having the pilot symbols included in the first set of subbands; and
means for transmitting the pilot signal from the first transmitting entity.

9. The apparatus of claim 8, further comprising:
means for processing the pilot symbols with an orthogonal code to obtain covered pilot symbols, and wherein the covered pilot symbols are further processed to obtain the pilot signal.

10. The apparatus of claim 8, further comprising:
means for processing the pilot symbols with a scrambling code to obtain scrambled pilot symbols, and wherein the scrambled pilot symbols are further processed to obtain the pilot signal.

11. A base station in a wireless multi-carrier communication system, comprising:
at least one pilot processor operative to receive and process pilot symbols designated for transmission on a first set of subbands, wherein the first set of subbands is used for pilot transmission by the base station and is disjoint from a second set of subbands used for pilot transmission by another base station in the system, and wherein each pair of adjacent subbands in the first set encompasses a frequency span that is less than or equal to a coherence bandwidth of a wireless channel in the system;
a transform unit operative to derive time-domain samples having the covered pilot symbols included in the first set of subbands; and
a transmitter unit operative to process the time-domain samples to obtain a pilot signal for transmission on a downlink.

12. A computer-readable medium for transmitting a pilot on a downlink in a wireless multi-carrier communication system, the computer-readable medium comprising instructions which, when executed by a processor, cause said processor to perform the steps of:
generating pilot symbols for transmission from a first transmitting entity on a first set of subbands that is disjoint from a second set of subbands used for pilot transmission by a second transmitting entity, and wherein each pair of adjacent subbands in the first set encompasses a frequency span that is less than or equal to a coherence bandwidth of a wireless channel in the system; and
processing the pilot symbols to obtain time-domain samples having the pilot symbols included in the first set of subbands.

13. A method of processing pilots received via a downlink in a wireless multi-carrier communication system, comprising:
receiving a first pilot signal on a first set of subbands from a first transmitting entity, wherein the first set of subbands is used for pilot transmission by the first transmitting entity and is disjoint from a second set of subbands used for pilot transmission by a second transmitting entity, and wherein each pair of adjacent subbands in the first set encompasses a frequency span that is less than or equal to a coherence bandwidth of a wireless channel in the system; and
processing the first pilot signal to obtain a pilot estimate for each of the subbands in the first set.

14. The method of claim 13, further comprising:
deriving a channel estimate for each of the subbands in the first set based on the pilot estimate for the subband.

15. The method of claim 14, further comprising:
deriving a channel estimate for at least one subband not in the first set based on channel estimates for the subbands in the first set.

16. The method of claim 13, further comprising:
deriving a signal strength estimate for the first pilot signal based on pilot estimates for the first set of subbands.

17. The method of claim 13, further comprising:
receiving a second pilot signal on the second set of subbands from the second transmitting entity; and
processing the second pilot signal to obtain a pilot estimate for each of the subbands in the second set.

18. The method of claim 17, further comprising:
deriving a channel estimate for each of the subbands in the second set based on the pilot estimate for the subband.

19. An apparatus in a wireless multi-carrier communication system, comprising:
means for receiving a first pilot signal on a first set of subbands from a first transmitting entity, wherein the first set of subbands is used for pilot transmission by the first transmitting entity and is disjoint from a second set of subbands used for pilot transmission by a second transmitting entity, and wherein each pair of adjacent subbands in the first set encompasses a frequency span that is less than or equal to a coherence bandwidth of a wireless channel in the system; and
means for processing the first pilot signal to obtain a pilot estimate for each of the subbands in the first set.

20. The apparatus of claim 19, further comprising:
means for deriving a channel estimate for each of the subbands in the first set based on the pilot estimate for the subband.

21. The apparatus of claim 19, further comprising:
means for receiving a second pilot signal on the second set of subbands from the second transmitting entity; and
means for processing the second pilot signal to obtain a pilot estimate for each of the subbands in the second set.

22. A terminal in a wireless multi-carrier communication system, comprising:
a receiver unit operative to process a pilot signal received on a first set of subbands, wherein the first set of subbands is used for pilot transmission by a first transmitting entity and is disjoint from a second set of subbands used for pilot transmission by a second transmitting entity, and wherein each pair of adjacent subbands in the first set encompasses a frequency span that is less than or equal to a coherence bandwidth of a wireless channel in the system; and
at least one pilot processor operative to process the pilot signal to obtain a pilot estimate for each of the subbands in the first set.

23. A computer-readable medium for processing pilots received via a downlink in a wireless multi-carrier communication system, the computer-readable medium comprising instructions which, when executed by a processor, cause said processor to perform the steps of:
receiving a first pilot signal on a first set of subbands from a first transmitting entity, wherein the first set of subbands is used for pilot transmission by the first transmitting entity and is disjoint from a second set of subbands used for pilot transmission by a second transmitting entity, and wherein each pair of adjacent subbands in the first set encompasses a frequency span that is less than or equal to a coherence bandwidth of a wireless channel in the system; and
processing the first pilot signal to obtain a pilot estimate for each of the subbands in the first set.

24. A method of transmitting a pilot in a wireless multi-carrier communication system, comprising:
generating pilot symbols for transmission on a first set of subbands used for pilot transmission by a first transmitting entity;
processing the pilot symbols with a first code to obtain covered pilot symbols, wherein the first code is orthogonal to a second code used for pilot transmission by a second transmitting entity;
processing the covered pilot symbols to obtain a pilot signal having the pilot symbols included in the first set of subbands;
processing the covered pilot symbols with a scrambling code to obtain scrambled pilot symbols, and wherein the scrambled pilot symbols are further processed to obtain the pilot signal, wherein the first code includes chips, and wherein each chip of the scrambling code is applied to pilot symbols; and
transmitting the pilot signal from the first transmitting entity.

25. The method of claim 24, wherein the first code is a Walsh code.

26. The method of claim 24, wherein the first code is applied to each of the subbands in the first set.

27. The method of claim 24, wherein the scrambling code is a pseudo-random number (PN) code.

28. The method of claim 24, wherein the scrambling code is divided into a plurality of scrambling code segments, one scrambling code segment for each of the subbands in the first set, and wherein pilot symbols for each of the subbands in the first set are multiplied with the scrambling code segment for the subband.

29. The method of claim 24, wherein each chip of the scrambling code is applied to one pilot symbol.

30. The method of claim 24, wherein the subbands in the first set are evenly distributed across a plurality of subbands usable for pilot and data transmission by the first transmitting entity.

31. The method of claim 24, wherein each pair of adjacent subbands in the first set encompasses a frequency span that is less than or equal to a coherence bandwidth of a wireless channel in the system.

32. The method of claim 24, wherein the pilot symbols transmitted from the first transmitting entity are different from pilot symbols transmitted from the second transmitting entity.

33. The method of claim 24, wherein the first set of subbands is disjoint from a second set of subbands used for pilot transmission by a third transmitting entity.

34. The method of claim 33, wherein pilot signals are transmitted in bursts from the first and second transmitting entities.

35. The method of claim 33, wherein pilot signals are transmitted continuously from the first and second transmitting entities.

36. The method of claim 24, wherein pilot signals are transmitted with synchronous timing from the first and second transmitting entities.

37. The method of claim 24, wherein pilot signals are transmitted with asynchronous timing from the first and second transmitting entities.

38. The method of claim 24, wherein the multi-carrier communication system implements orthogonal frequency division multiplexing (OFDM).

39. An apparatus in a wireless multi-carrier communication system, comprising:
means for generating pilot symbols for transmission on a set of subbands used for pilot transmission by a first transmitting entity;
means for processing the pilot symbols with a first code to obtain covered pilot symbols, wherein the first code is orthogonal to a second code used for pilot transmission by a second transmitting entity;
means for processing the covered pilot symbols to obtain a pilot signal having the pilot symbols included in the set of subbands;
means for processing the covered pilot symbols with a scrambling code to obtain scrambled pilot symbols, and wherein the scrambled pilot symbols are further processed to obtain the pilot signal, wherein the first code includes chips, and wherein each chip of the scrambling code is applied to pilot symbols; and means for transmitting the pilot signal from the first transmitting entity.

40. The apparatus of claim 39, further comprising:

means for processing the pilot symbols with a scrambling code to obtain the scrambled pilot symbols, and wherein scrambled pilot symbols are processed to obtain the pilot signal.

41. A base station in a wireless multi-carrier communication system, comprising:

at least one pilot processor operative to receive and process pilot symbols with a first code to obtain covered pilot symbols, wherein the pilot symbols are designated for transmission on a set of subbands used for pilot transmission by the base station, and wherein the first code is orthogonal to a second code used for pilot transmission by another base station in the system, the covered pilot symbols are processed with a scrambling code to obtain scrambled pilot symbols, and wherein the scrambled pilot symbols are further processed to obtain the pilot signal, wherein the first code includes chips, and wherein each chip of the scrambling code is applied to pilot symbol;

a transform unit operative to derive time-domain samples having the covered pilot symbols included in the set of subbands; and a transmitter unit operative to process the time-domain samples to obtain a pilot signal for transmission over a wireless link.

42. A computer-readable medium for transmitting a pilot in a wireless multi-carrier communication system, the computer-readable medium comprising instructions which, when executed by a processor, cause said processor to perform the steps of:

generating pilot symbols for transmission on a first set of subbands used for pilot transmission by a first transmitting entity;

processing the pilot symbols with a first code to obtain covered pilot symbols, wherein the first code is orthogonal to a second code used for pilot transmission by a second transmitting entity; and processing the covered pilot symbols with a scrambling code to obtain scrambled pilot symbols, and wherein the scrambled pilot symbols are further processed to obtain the pilot signal, wherein the first code includes chips, and wherein each chip of the scrambling code is applied to pilot symbols.

43. A method of processing pilots received via a wireless link in a wireless multi-carrier communication system, comprising:

receiving a first pilot signal on a first set of subbands used for pilot transmission by a first transmitting entity;

processing the first pilot signal with a first code to obtain decovered symbols for the first transmitting entity, wherein the first code is used for pilot transmission by the first transmitting entity and is orthogonal to a second code used for pilot transmission by a second transmitting entity; and processing the decovered symbols for the first transmitting entity to obtain a pilot estimate for each of the subbands in the first set.

44. The method of claim 43, further comprising:

deriving a channel estimate for each of the subbands in the first set based on the pilot estimate for the subband.

45. The method of claim 44, further comprising:

deriving a channel estimate for at least one subband not in the first set based on channel estimates for the subbands in the first set.

46. The method of claim 43, further comprising:

deriving a signal strength estimate for the first pilot signal based on pilot estimates for the subbands in the first set.

47. The method of claim 43, further comprising:

processing the decovered symbols for the first transmitting entity with a descrambling code for the first transmitting entity.

48. The method of claim 43, further comprising:

receiving a second pilot signal on a second set of subbands used for pilot transmission by the second transmitting entity;

processing the second pilot signal with the second code to obtain decovered symbols for the second transmitting entity; and processing the decovered symbols for the second transmitting entity to obtain a pilot estimate for each of the subbands in the second set.

49. An apparatus in a wireless multi-carrier communication system, comprising:

means for receiving a pilot signal on a set of subbands used for pilot transmission by a first transmitting entity;

means for processing the pilot signal with a first code to obtain decovered symbols, wherein the first code is used for pilot transmission by the first transmitting entity and is orthogonal to a second code used for pilot transmission by a second transmitting entity; and means for processing the decovered symbols to obtain a pilot estimate for each of the subbands in the set.

50. A terminal in a wireless multi-carrier communication system, comprising:

a receiver unit operative to process a pilot signal received on a set of subbands used for pilot transmission by a first transmitting entity; and at least one pilot processor operative to process the pilot signal with a first code to obtain decovered symbols and to process the decovered symbols to obtain a pilot estimate for each of the subbands in the set, wherein the first code is used for pilot transmission by the first transmitting entity and is orthogonal to a second code used for pilot transmission by a second transmitting entity.

51. A computer-readable medium for processing pilots received via a wireless link in a wireless multi-carrier communication system, the computer-readable medium comprising instructions which, when executed by a processor, cause said processor to perform the steps of:

receiving a first pilot signal on a first set of subbands used for pilot transmission by a first transmitting entity;

processing the first pilot signal with a first code to obtain decovered symbols for the first transmitting entity, wherein the first code is used for pilot transmission by the first transmitting entity and is orthogonal to a second code used for pilot transmission by a second transmitting entity; and processing the decovered symbols for the first transmitting entity to obtain a pilot estimate for each of the subbands in the first set.

52. A method of canceling pilot interference at a receiver in a wireless multi-carrier communication system, comprising:

obtaining received symbols for a plurality of subbands, wherein the received symbols include desired symbols received from a first transmitting entity and pilot symbols received from a second transmitting entity;

deriving pilot symbol estimates for the second transmitting entity based on the received symbols, wherein the pilot symbol estimates are estimates of pilot symbols received on the plurality of subbands from the second transmitting entity; and subtracting the pilot symbol estimates for the second transmitting entity from the received symbols to obtain pilot-canceled symbols.

53. The method of claim 52, wherein the deriving and subtracting are performed separately for each of the plurality of subband.

54. The method of claim 52, wherein the deriving includes obtaining channel estimates for the second transmitting entity, and wherein the pilot symbol estimates are derived using the channel estimates.

55. The method of claim 52, wherein the desired symbols for the first transmitting entity are pilot symbols.

56. The method of claim 52, wherein the desired symbols for the first transmitting entity are data symbols.

57. The method of claim 52, wherein the deriving includes multiplying pilot symbols for each of the plurality of subbands with an orthogonal code to obtain covered pilot symbols for the subband, wherein the orthogonal code is used by the second transmitting entity for pilot transmission, and multiplying the covered pilot symbols for each of the plurality of subbands with channel estimates for the subband to obtain pilot symbol estimates for the subband.

58. The method of claim 57, wherein the deriving further includes multiplying the pilot symbols for each of the plurality of subbands with chips from a scrambling code to obtain scrambled pilot symbols for the subband, and wherein the scrambled pilot symbols are multiplied with the orthogonal code to obtain the covered pilot symbols.

59. The method of claim 52, wherein the received symbols further include pilot symbols received from a third transmitting entity, the method further comprising:

deriving pilot symbol estimates for the third transmitting entity based on the received symbols; and subtracting the pilot symbol estimates for the third transmitting entity from the received symbols to obtain the pilot-canceled symbols.

60. An apparatus in a wireless multi-carrier communication system, comprising:

means for obtaining received symbols for a plurality of subbands, wherein the received symbols include desired symbols received from a first transmitting entity and pilot symbols received from a second transmitting entity;

means for deriving pilot symbol estimates for the second transmitting entity based on the received symbols, wherein the pilot symbol estimates are estimates of pilot symbols received on the plurality of subbands from the second transmitting entity; and means for subtracting the pilot symbol estimates for the second transmitting entity from the received symbols to obtain pilot-canceled symbols.

61. A terminal in a wireless multi-carrier communication system, comprising:

at least one pilot interference estimator operative to process received symbols for a plurality of subbands to obtain pilot symbol estimates for the plurality of subbands, wherein the received symbols include desired symbols received from a first transmitting entity and pilot symbols received from a second transmitting entity, and wherein the pilot symbol estimates are estimates of pilot symbols received on the plurality of subbands from the second transmitting entity; and a summer operative to subtract the pilot symbol estimates from the received symbols to obtain pilot-canceled symbols.

* * * * *